United States Patent
Suino

(10) Patent No.: US 6,701,008 B1
(45) Date of Patent: Mar. 2, 2004

(54) METHOD, COMPUTER READABLE MEDIUM AND APPARATUS FOR EXTRACTING CHARACTERS FROM COLOR IMAGE DATA

(75) Inventor: Tooru Suino, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/487,340

(22) Filed: Jan. 19, 2000

(30) Foreign Application Priority Data

Jan. 19, 1999 (JP) .......................................... 11-010969

(51) Int. Cl.$^7$ ................................................ G06K 9/00
(52) U.S. Cl. ........................ 382/164; 382/176; 358/464
(58) Field of Search ............................... 382/162–167, 382/171–180; 358/451–466

(56) References Cited

U.S. PATENT DOCUMENTS

| | | | | |
|---|---|---|---|---|
| 5,555,556 A | * | 9/1996 | Ozaki .......................... | 382/173 |
| 5,581,633 A | * | 12/1996 | Hotta et al. .................. | 382/171 |
| 6,023,526 A | * | 2/2000 | Kondo et al. ................ | 382/165 |
| 6,188,790 B1 | * | 2/2001 | Yoshikawa et al. ......... | 382/194 |

FOREIGN PATENT DOCUMENTS

| | | | | |
|---|---|---|---|---|
| EP | 0933719 A2 | * | 8/1999 | ............. G06K/9/20 |
| JP | 405274472 A | * | 10/1993 | ............. G06K/9/20 |
| JP | 8-123901 | | 5/1996 | |
| JP | 410031716 A | * | 2/1998 | ............. G06K/9/20 |

OTHER PUBLICATIONS

Chiou et al. "Recognition of Chnese Business Cards" Proc. of the Fourth International conference on Document Analysis and Recognition, 1997, vol. 2.pp1028–1032, Aug. 1997.*
U.S. patent application Ser. No. 09/487,340, Suinon, filed Jan. 19, 2000.
U.S. patent application Ser. No.10/391,211, Morimoto et al, Mar. 19, 2003.

* cited by examiner

*Primary Examiner*—Jingge Wu
(74) *Attorney, Agent, or Firm*—Oblon, Spivak, McClelland, Maier & Neustadt, P.C.

(57) ABSTRACT

A method, computer program product and apparatus for extracting characters from color image data include inputting color image data, separating the input color image data into a plurality of color component data, and converting each of the plurality of color component data into a plurality of bi-level color component data, respectively. Other functions include circumscribing rectangles around linked pixels having identical bi-level values in the plurality of bi-level color component data, respectively; selecting the circumscribed rectangles in the plurality of bi-level color component data, respectively, based on the sizes of the circumscribed rectangles; merging the bi-level color component data inside the selected circumscribed rectangles; and outputting the merged bi-level image data.

13 Claims, 23 Drawing Sheets

FIG. 5

| | | INTENSITY OF COLOR COMPONENT | | | IMAGE COLOR |
|---|---|---|---|---|---|
| | | RED | GREEN | BLUE | |
| LINE 1 | CHARACTER STRING 91 | 0 | 0 | 255 | BLUE |
| | BACKGROUND 91H | 255 | 255 | 255 | WHITE |
| LINE 2 | CHARACTER STRING 92 | 255 | 255 | 0 | YELLOW |
| | BACKGROUND 92H | 200 | 255 | 200 | LIGHT GREEN |
| LINE 3 | CHARACTER STRING 93 | 240 | 0 | 240 | MAGENTA |
| | BACKGROUND 93H | 200 | 200 | 255 | LIGHT BLUE |
| LINE 4 | CHARACTER STRING 94 | 255 | 255 | 0 | YELLOW |
| | BACKGROUND 94H | 50 | 20 | 20 | DARK RED |
| LINE 5 | CHARACTER STRING 105 | 200 | 200 | 255 | LIGHT BLUE |
| | BACKGROUND 95H | 20 | 50 | 20 | DARK GREEN |
| LINE 6 | CHARACTER STRING 96 | 200 | 255 | 200 | LIGHT GREEN |
| | BACKGROUND 96H | 20 | 20 | 50 | DARK BLUE |

FIG. 7

| | | BI-LEVEL COLOR COMPONENT | | |
|---|---|---|---|---|
| | | RED | GREEN | BLUE |
| LINE 1 | CHARACTER STRING 91 | 0 | 0 | 1 |
| | BACKGROUND 91H | 1 | 1 | 1 |
| LINE 2 | CHARACTER STRING 92 | 1 | 1 | 0 |
| | BACKGROUND 92H | 1 | 1 | 1 |
| LINE 3 | CHARACTER STRING 93 | 1 | 0 | 1 |
| | BACKGROUND 93H | 1 | 1 | 1 |
| LINE 4 | CHARACTER STRING 94 | 1 | 1 | 0 |
| | BACKGROUND 94H | 0 | 0 | 0 |
| LINE 5 | CHARACTER STRING 95 | 1 | 1 | 1 |
| | BACKGROUND 95H | 0 | 0 | 0 |
| LINE 6 | CHARACTER STRING 96 | 1 | 1 | 1 |
| | BACKGROUND 96H | 0 | 0 | 0 |

METHOD, COMPUTER READABLE MEDIUM AND APPARATUS FOR EXTRACTING CHARACTERS FROM COLOR IMAGE DATA

CROSS REFERENCE TO RELATED APPLICATION

This application claims benefit of priority to Japanese Patent Application No. 11-010969 filed Jan. 19, 1999, the entire disclosure of which is incorporated by reference herein.

BACKGROUND OF THE INVENTION

1. Field of the Invention

The present invention relates to character recognition, in particular to a method, a computer readable medium and an apparatus for extracting characters from color image data.

2. Discussion of the Background

Character extraction technology provides preprocessing of an image document in a character recognition system, for example, in an optical character reading apparatus. The character extraction technology is also used in an image editing system, such as, character deletion within a graphic image, etc. In the present invention, the term "character" includes alphabetic letters, Arabian numerals, Roman numerals, Kana characters, Kanji or Chinese characters, Arabian characters, etc.

As a character extraction method, Japanese Laid-Open Patent Publication No. 08123901 describes a character extraction and recognition device. The device has a color image input device, a color space converting device, a color space dividing device, an image data to binary data converting device, a character extraction device, and a character recognition device. In the character extraction and recognition device, the input color image data is divided into a plurality of color ranges, in which characters are extracted using divided color ranges. However, the character extraction and recognition device does not disclose a method for simultaneously extracting plural color characters.

Use of color documents and color visual mediums, such as, color printed maters, color photocopies, and print outs of Internet web pages, are increasing. For example, web pages in the Internet are filled with various types of characters in various colors on various types of backgrounds (e.g., colored, pattered, pictorial, graphic image background, etc.). Accordingly, a demand for extracting color characters on a white or colored background including a graphic image is increasing. A demand for extracting white or relatively light color characters on a relatively dark background is also increasing.

SUMMARY OF THE INVENTION

The present invention has been made in view of the above-discussed and other problems, and has as one objective to overcome the above-discussed and other problems with the background apparatuses and methods. Accordingly, one object of the present invention is to provide a novel method, computer program product and apparatus for extracting characters from color image data that can simultaneously extract characters having a plurality of colors.

Another object of the present invention is to provide a novel method, computer program product and apparatus for extracting characters from color image data that can extract a plurality of white or relatively light color characters on a relatively dark color background.

To achieve these and other objects, the present invention provides a novel method, computer program product and apparatus for extracting characters from color image data that include inputting color image data; separating the input color image data into a plurality of color component data; and converting each of the plurality of color component data into a plurality of bi-level color component data, respectively. Other functions include circumscribing rectangles around linked pixels having identical bi-level values in the plurality of bi-level color component data, respectively; selecting the circumscribed rectangles in the plurality of bi-level color component data, respectively, based on the sizes of the circumscribed rectangles; merging the bi-level color component data inside the selected circumscribed rectangles; and outputting the merged bi-level image data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a table illustrating a relationship among a character string and the background, light intensity of color components, and an image color for each of a plurality of character strings in the document of FIG. 4;

FIG. 7 is a table illustrating bi-level color component values of character strings and backgrounds;

DESCRIPTION OF THE PREFERRED EMBODIMENTS

Figure 1:
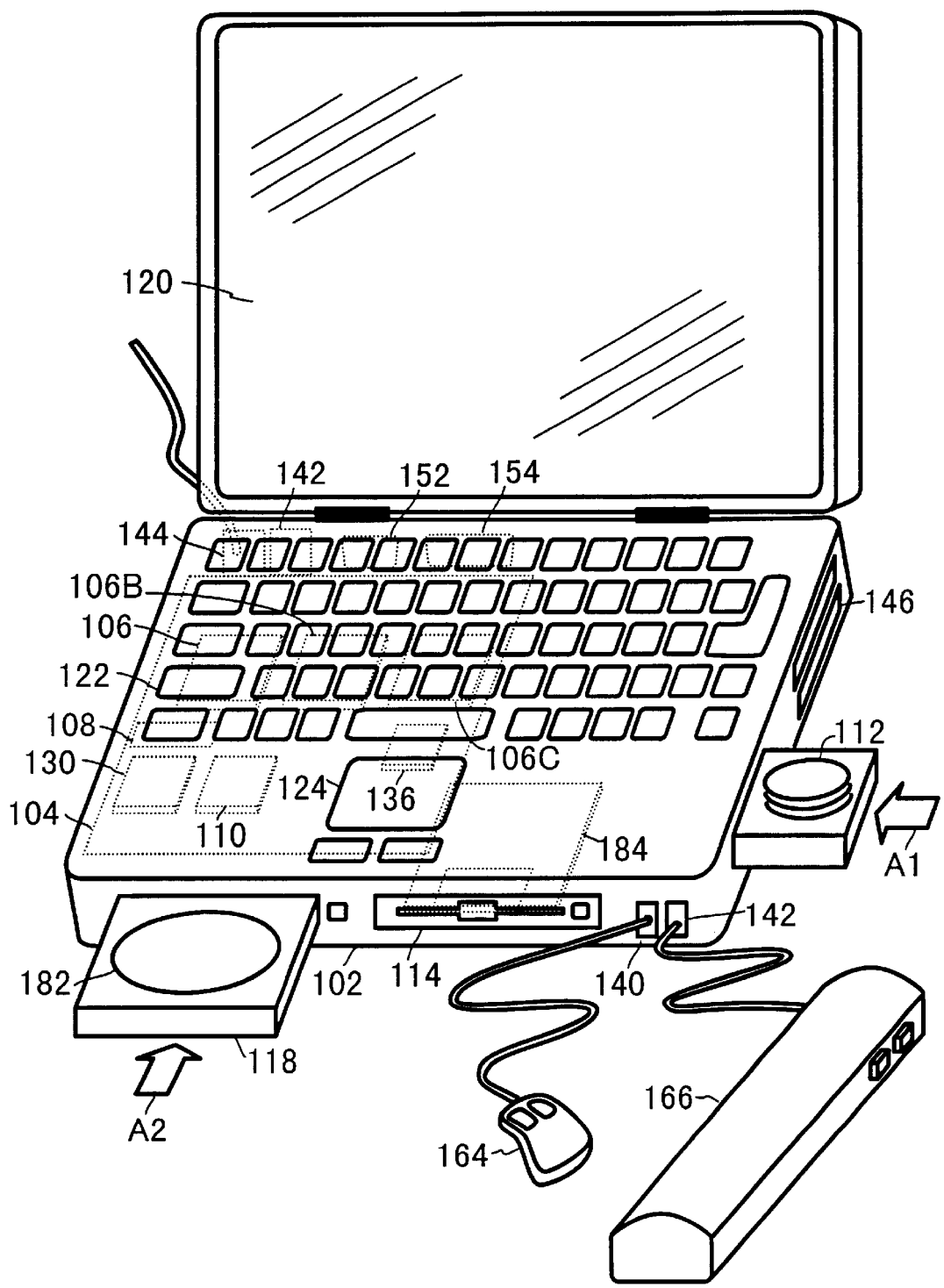
FIG. 1 is a schematic illustration of a computer system for executing a character extracting method according to an embodiment of the present invention.
Figure 2:
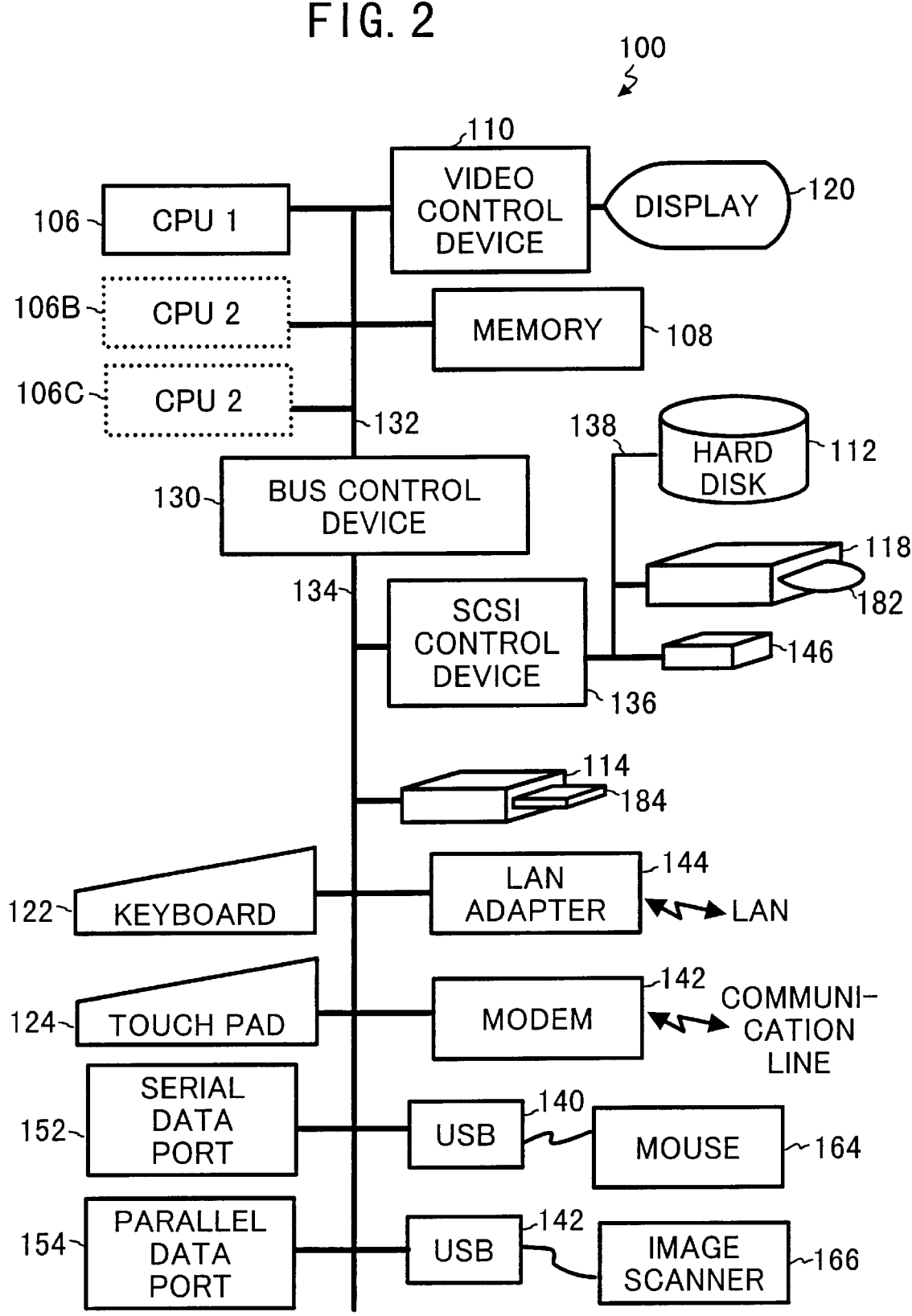
FIG. 2 is a schematic block diagram of the computer system of FIG. 1.

Referring now to the drawings, wherein like reference numerals designate identical or corresponding parts throughout the several views, and more particularly to FIG. 1 thereof, is shown as an example of a computer system 100; and FIG. 2 is a schematic block diagram of the system 100 for executing a character extracting method according to an embodiment of the present invention. The computer system 100 implements the method of the present invention, wherein computer housing 102 (FIG. 1) houses a motherboard 104 (FIG. 1) that contains a CPU 106, a second and a third optional CPUs 106B and 106C, a memory 108 (e.g., DRAM, ROM, EPROM, EEPROM, SRAM, SDRAM, and Flash RAM), a local bus 132 (FIG. 2). The motherboard 104 also contains a video control device 110 for controlling a monitor 120, a bus control device 130, a PCI bus 134 (FIG. 2), a SCSI control device 136, and a SCSI bus 138 (FIG. 2). The motherboard 104 further contains a serial data port 152, a parallel data port 154 and other optional purpose logic devices (e.g., ASICs) or configurable logic devices (e.g., GAL and reprogrammable FPGA).

A hard disk drive 112, which is changeable, a DVD drive 118, and a card adapter 146 are connected to the SCSI bus 138 (FIG. 2). The hard disk drive 112 and the DVD drive 118 are inserted along the arrows A1 and A2 (FIG. 1) inside the computer housing 102 in use. A mouse 164 is connected to a USB port 140, and an image scanner 166 connected to a USB port 142. A keyboard 122, a touch pad 124, floppy disk drive 114, a LAN adapter 144, and a modem are connected to the PCI bus 134. Also connected to the SCSI bus 138, the USB ports 142 and 143, or another ports, the computer system 100 may additionally include a magneto-optical-disk drive, a tape drive, a compact disc reader/writer drive, and a printer. Further, the computer system 100 may be connected to a network system via the LAN adapter 144 or the modem 146.

As stated above, the system 100 includes at least one computer readable medium. Examples of computer readable medium are hard disks 112, DVD-ROM disks 180, DVD-RAM disks, compact disks, magneto-optical-disks, floppy disks 182, tape, PROMs (EPROM, EEPROM, Flash ROM), DRAM, SRAM, SDRAM, and etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for practicing the character extraction. The computer code devices of present invention can be any interpreted or executable code mechanism, including but not limited to scripts, interpreters, dynamic link libraries, Java classes, and complete executable programs.

Figure 3:
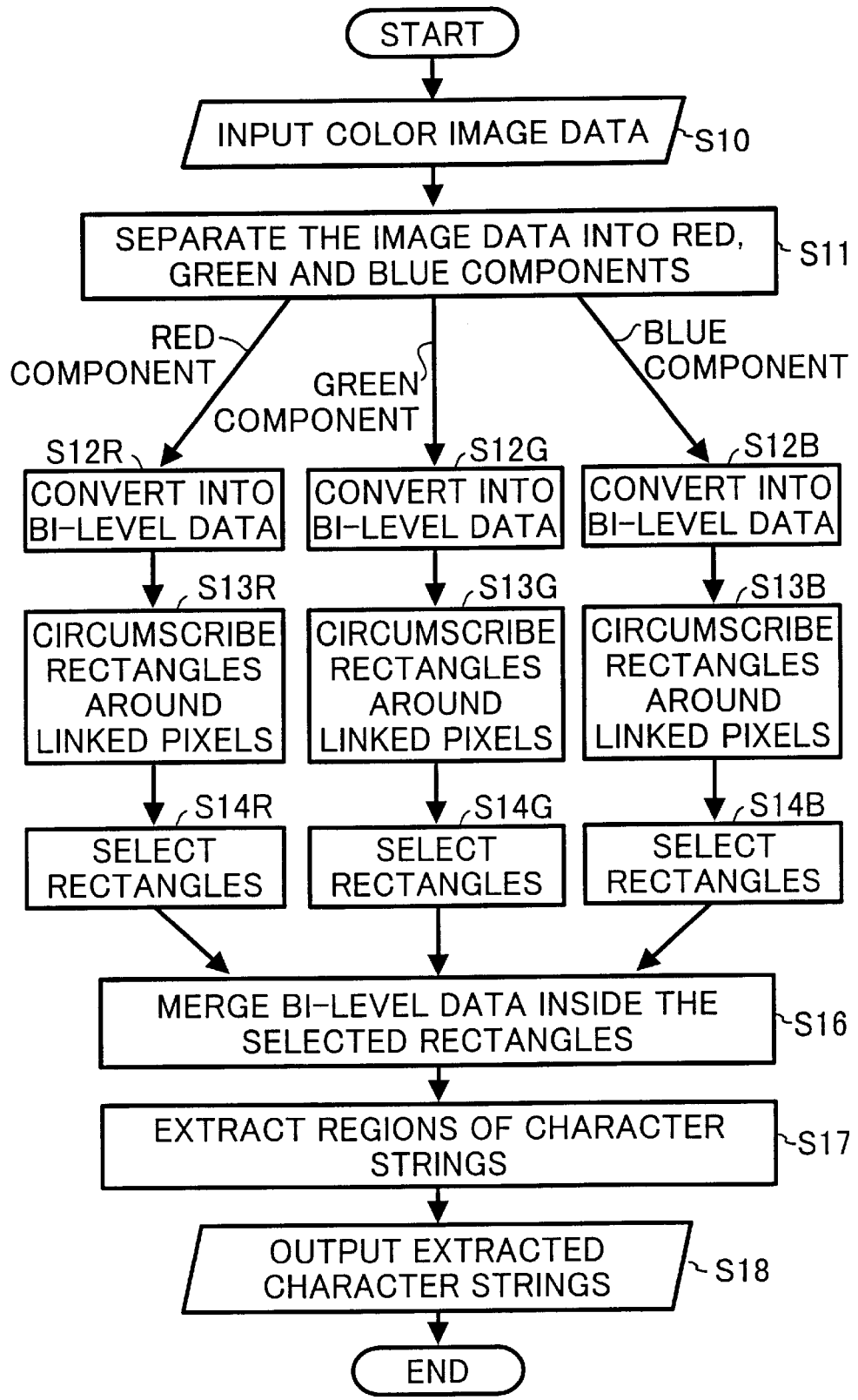
FIG. 3 is a flowchart illustrating operational steps for practicing a character extracting method as an example configured according to an embodiment of the present invention.

FIG. 3 is a flowchart illustrating operational steps for practicing an exemplary character extracting method according to an embodiment of the present invention. Initially, per step S10, a color image data is input to the computer system 100. Subsequently, in step S11, the image data is separated into red, green and blue components. Further processing of the individual components is performed beginning with steps S12R, S12G and S12B. In step S12R, the individual component is converted into bi-level data. In step S13R, each of the plural linked pixels (picture elements) that have the same (or identical) bi-level data is circumscribed with a rectangle. In step S14R, the circumscribed rectangles are selected such that each of the selected rectangles circumscribes characters or elements of characters. The steps S12G, S13G and S14G, and the steps S12B, S13B and S14B are respectively performed in substantially the same manner as the steps S12R, S13R and S14R.

Next, the bi-level data inside the selected rectangles in the red, green and blue components are merged, per step S16. In step S17, regions of character strings are optionally extracted. In step S18, extracted characters and the extracted regions of character strings are output, for example, to a storage device (e.g., the hard disk drive 112) or to other computers in a network via the LAN adapter 144.

Attention is now turned to each of the processing steps, which are described in more detail below. In the step S10, the CPU 106 inputs image data such as image data of a document 90 (shown in FIG. 4). The image data may be input from, for example, the image scanner 166, a DVD-ROM 182, a floppy disk 184, a network via the LAN adapter 144, or the modem 142. The input image data may be allocated in a portion of the memory 108. In addition, the input image data may be temporally stored, for example, in the hard disk 112, the floppy disk 184, a DVD-RAM disks, etc.

The input image data may be structured by an analog signal format (e.g., the NTSC format, pixel mapped data, or digital data compression format data (e.g., JPEG data). When image data is input as an analog signal, the input signal is converted into digital data in a pixel mapped data format. When image data is input as compressed digital data, the compressed data is expanded into the pixel mapped data. In the pixel mapped data, each pixel data is structured by a plurality of color data. For example, the image scanner 166 of FIG. 1 outputs pixel mapped data, therefore when the CPU 106 inputs image data from the image scanner 166, no data conversion is needed.

Figure 4:
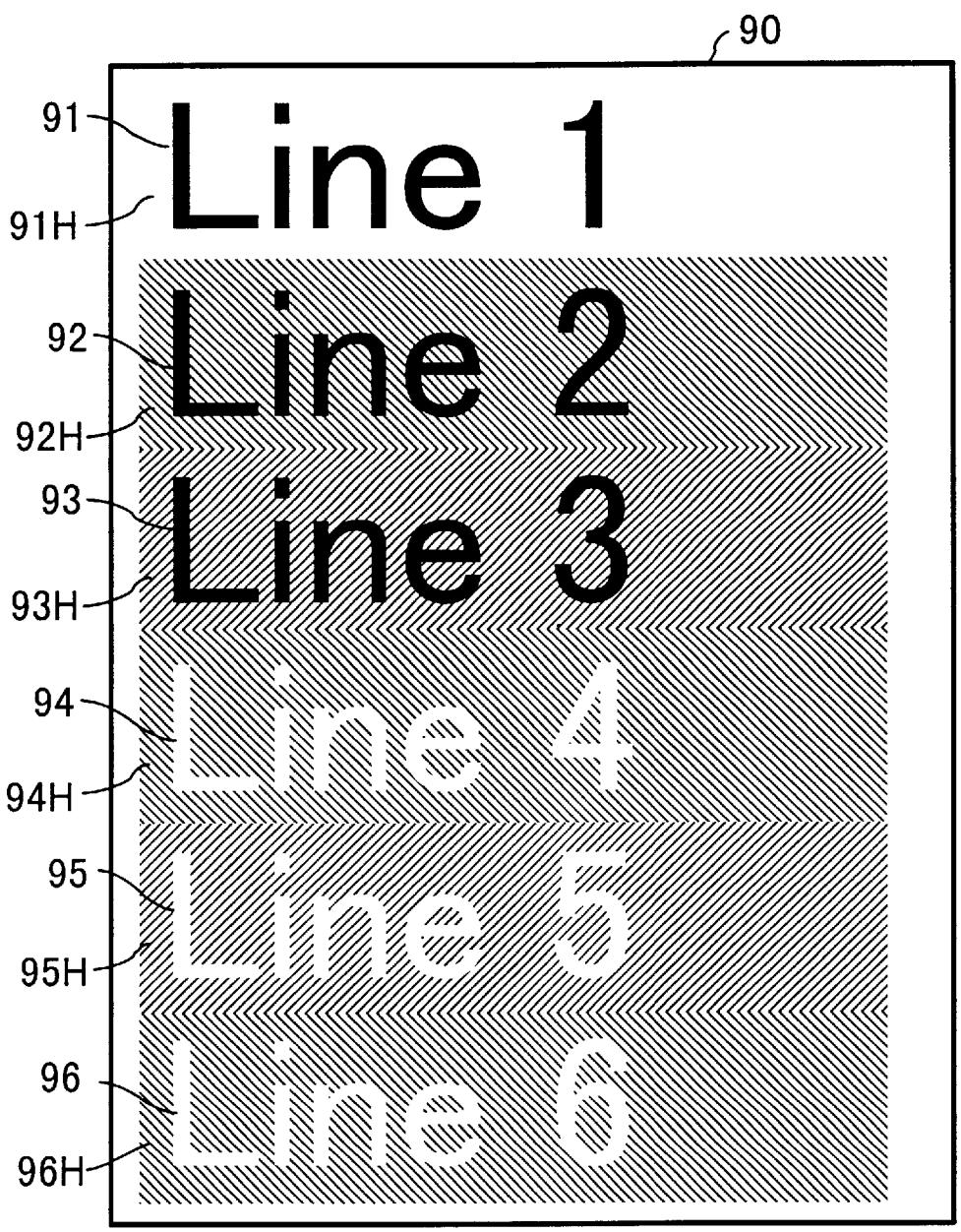
FIG. 4 is an example of a document having plural color character strings on plural color backgrounds.

FIG. 5 is a table illustrating a relationship among a character string and associated background, light intensity of color components, and an image color each of a plurality of character strings and background of the strings in FIG. 4. In FIG. 5, INTENSITY OF COLOR COMPONENT denotes intensities of the three primary color lights, i.e., red, green and blue, which are reflected from the document 90 by irradiation with white light. The numerals in the columns of INTENSITY OF COLOR COMPONENT range from 0 to 255 (i.e., 1 byte data); a numeral 0 represents no reflection light component, and a numeral 255 represents the maximum reflection light of a component. In other words, each of the light intensities of the color components is proportional to a value, shown in the column. IMAGE COLOR denotes a color of a character string and a color of a background of the character string, which is structured by the three color components in the same row.

Referring to FIG. 4 and FIG. 5, a character string "LINE 1" 91 has a red color component of 0, a green color component of 0, and a blue color component of 255, thereby the string "LINE 1" 91 is perceived as blue by human eyes. A background 91H under the string "LINE 1" 91 has a red color component of 255, a green color component of 255, and a blue color component of 255, thereby the background 91H is observed as white.

Likewise, a character string "LINE 2" 92 is observed as yellow on a light green background 92H. A character string "LINE 3" 93 is observed as magenta on a light blue background 93H. In other words, the character strings 94, 95 and 96 may be observed as relatively dark color character strings on the relatively light color backgrounds.

On the other hand, a character string "LINE 4" 94 is observed as yellow surrounded by a dark green background 94H. A character string "LINE 5" 95 is observed as light blue surrounded by a dark green background 95H. A character string "LINE 6" 96 is observed as light green surrounded by a dark blue background 96H. In other words, the character strings 91, 92 and 93 may be observed as light color character strings surrounded by the relatively dark color backgrounds.

Referring back to FIG. 3, in the step S11, the CPU 106 separates input image data into plural color components, such as the red component, the green component and the blue component, which are weighted with a predetermined ratio; for example, 1 to 1 to 1. The weight for separation may be modified such as, 1 to 2 to 1, depending upon the purpose of the character extraction. The CPU 106 may also separate input image data into other types of plural color components, such as a cyan component, a magenta component and a yellow component, which are referred to as the printing primary colors.

In this example, the steps S12R though S14R, the steps S12G though S14G, and the steps S12B though S14B may be simultaneously executed by, for example, a computer having multiple CPUs, such as the CPUs 106, 106B and 106C, using a multi-processor multi-process operating system. In addition, each of the parallel steps may also be simultaneously executed by distributed multiple computers in a network system. Further, the steps S12R though S14R, the steps S12G though S14G, and the steps S12B though S14B may also be executed sequentially.

In the step S12R, the CPU 106 converts the separated red component, which is represented by 1 byte, into bi-level or binary data. To convert the separated red component into the bi-level data, the step S12R may use a threshold value TH0 for dividing or slicing the separated red component. As an example for determining such the threshold value TH0, the CPU 106 may use a method of the followings.

Figure 6:
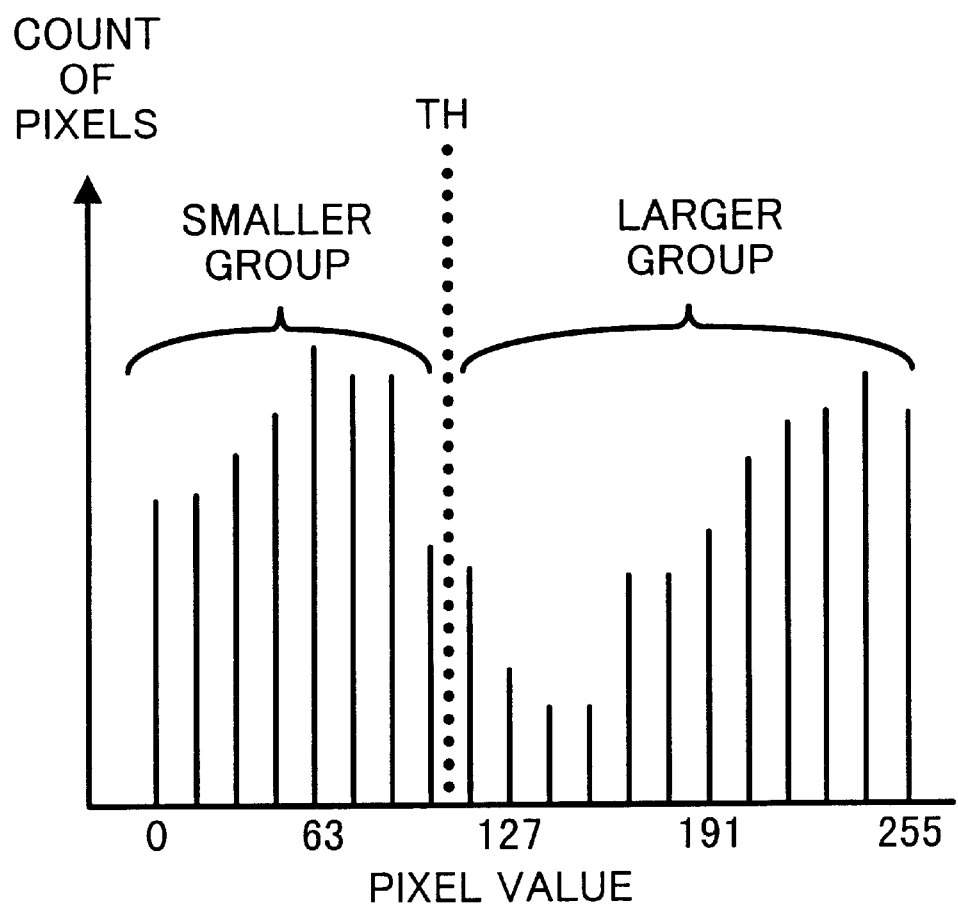
FIG. 6 is a graph illustrating a multi-level pixel value in a color component of the image data and a count of a pixel value.

FIG. 6 is a graph illustrating a multi-level pixel value in a color component and a count or the number of a pixel value. The horizontal axis represents the pixel value, i.e., from value 0 to value 255, and the vertical axis represents the count of a pixel in the color component. These counts, in which each corresponds to the pixel values 0 to 255, are illustrated as the vertical bars in FIG. 6.

A value denoted as TH in FIG. 6 divides the pixel values into two groups, in which the left side pixels have smaller values than the value TH, while the other have larger values than the value TH. The CPU 106 calculates a variance VS among the counts of pixels in the smaller value group and a variance VL among the counts of pixels in the larger value group. Additionally, the CPU 106 calculates a variance VT between the variance VS and the variance VL. The variance VT varies correspondingly with a value TH. When the value TH yields a maximum value of the variance VT, the CPU 106 determines the value TH as the threshold value TH0 for generating bi-level data.

The CPU 106 may determine the threshold value TH0 by other methods; for example, using the median value of the pixel values. Further, the threshold value TH0 may be as the same value as a pixel value that has the smallest count of a pixel value (except a count of zero).

When a pixel value of the red component is smaller than the threshold value TH0, the CPU 106 converts the pixel value into 0; and when the pixel value is larger than the threshold value TH0, the CPU 106 converts the pixel value into 1. Thus, the multi-level red component data is converted into bi-level data, i.e., "1" or "0". Likewise, in the step S12G, the CPU 106B converts the multi-level green component data into bi-level green data; and in the step S12B, the CPU 106C converts the multi-level blue component data into bi-level blue data.

FIG. 7 is a table illustrating the bi-level color component values, which are obtained by the processes of the steps S12R, S12G and S12B, in which each of the values in the row corresponds to the plurality of character strings and backgrounds of FIG. 4. In FIG. 7, BI-LEVEL COLOR COMPONENT denotes the converted bi-level component data of the three primary colors, i.e., red, green and blue. The numerals "0" and "1" in the columns represent the converted bi-level data of the three primary colors. The numeral 0 corresponds to a lower intensity of reflected light (i.e., relatively dark image) and the numeral 1 corresponds to a higher reflected light (i.e., relatively light image).

The converted character string "LINE 1" 91 has the bi-level red color component of 0, the bi-level green color component of 0, and the bi-level blue color component of 1. Therefore the character string "LINE 1" 91 may be perceived as blue. The converted background 91H under the character string 91 has the bi-level red color component of 1, the bi-level green color component of 1, and the bi-level blue color component of 1; therefore the background 91H may be observed as white.

Likewise, the converted character string "LINE 2" 92 may be observed as yellow on the white background 92H. The converted character string "LINE 3" 93 may be observed as magenta on the white background 93H. That is, the character strings 91, 92 and 93 may be observed as color character strings on the white backgrounds.

Similarly, the converted character string "LINE 4" 94 may be observed as yellow surrounded by the black background 94H. The converted character string "LINE 5" 95 may be observed as white surrounded by the black background 95H. The converted character string "LINE 6" 96 may also be observed as white surrounded by the black background 96H. That is, the character strings 94, 95 and 96 may be observed as colored or white character strings surrounded by the black backgrounds.

Figure 8:
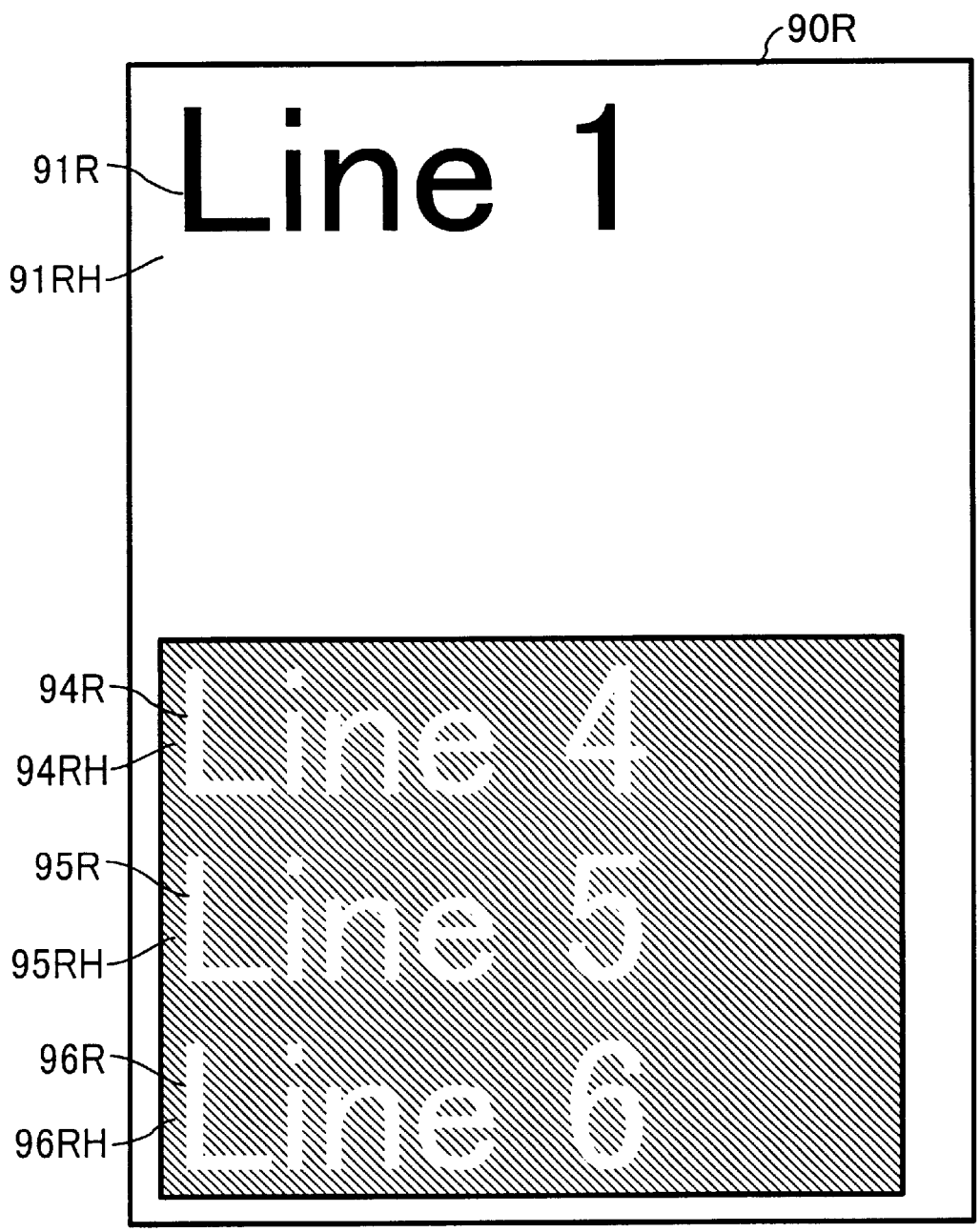
FIG. 8 is an illustration of a bi-level red component of the document of FIG. 4 placed on a red plane.

FIG. 8 is an illustration of the bi-level red component placed on a plane 90R. In this embodiment, such plane is referred to as a red plane. Similarly, it is referred to as a green plane for the green component, a blue plane for the blue component and a merged plane for merged data. As illustrated, the character string "LINE 1" 91R has a value 0 on the background 91RH, which has a value 1, therefore the character string "LINE 1" 91R is visible on the red plane 90R. On the other hand, the character strings "LINE 2" 92 and "LINE 3" 93 have a value 1, which is the same as the value of the background; therefore the strings "LINE 2" and "LINE 3" are not visible because they cannot be distinguished from the background. The character strings "LINE 4" 94R, "LINE 5" 95R and "LINE 6" 96R have a value 1, while the background has a value 0. Accordingly, the strings "LINE 4" 94R, "LINE 5" 95R and "LINE 6" 96R are visible on the red plane 90R.

In step S13R of FIG. 3, the CPU 106 circumscribes rectangles around linked pixels that have the same bi-level values in the bi-level red component. Linked pixels value may be either 0 or 1. In this example, the CPU 106 circumscribes rectangles around linked pixels with the same bi-level value 0.

Figure 9:
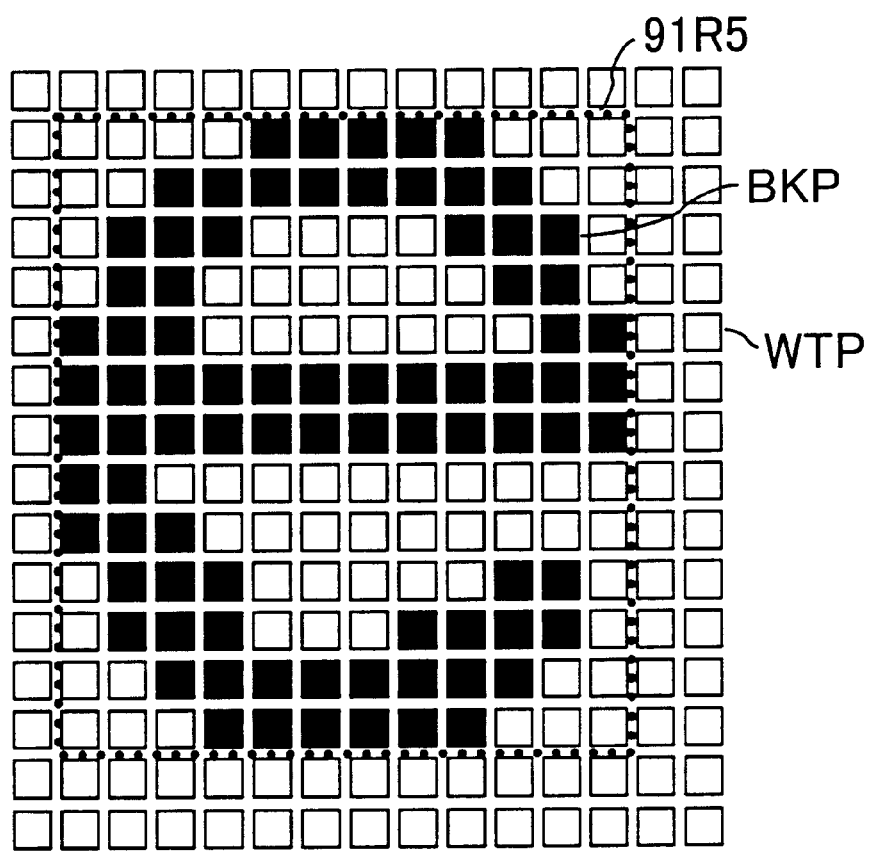
FIG. 9 is an illustration of a rectangle circumscribing around linked pixels of an exemplary character "e"

FIG. 9 is an exemplary illustration of a rectangle circumscribing the linked pixels of a character "e" in the character string "LINE 1" 91. In FIG. 9, a pixel with a value 0 is shown as a black square BKP, and a pixel with a value 1 is illustrated as a white square WTP. The size of the pixel, for example, may be 1/32 inch to 1/1200 inch. As illustrated, the character "e" is made up of a plurality of linked pixels with a value 0; accordingly the CPU 106 circumscribes a rectangle 91R5 illustrated by dotted lines around the linked black pixels. Other characters can be also circumscribed in substantially the same manner.

Figure 10:
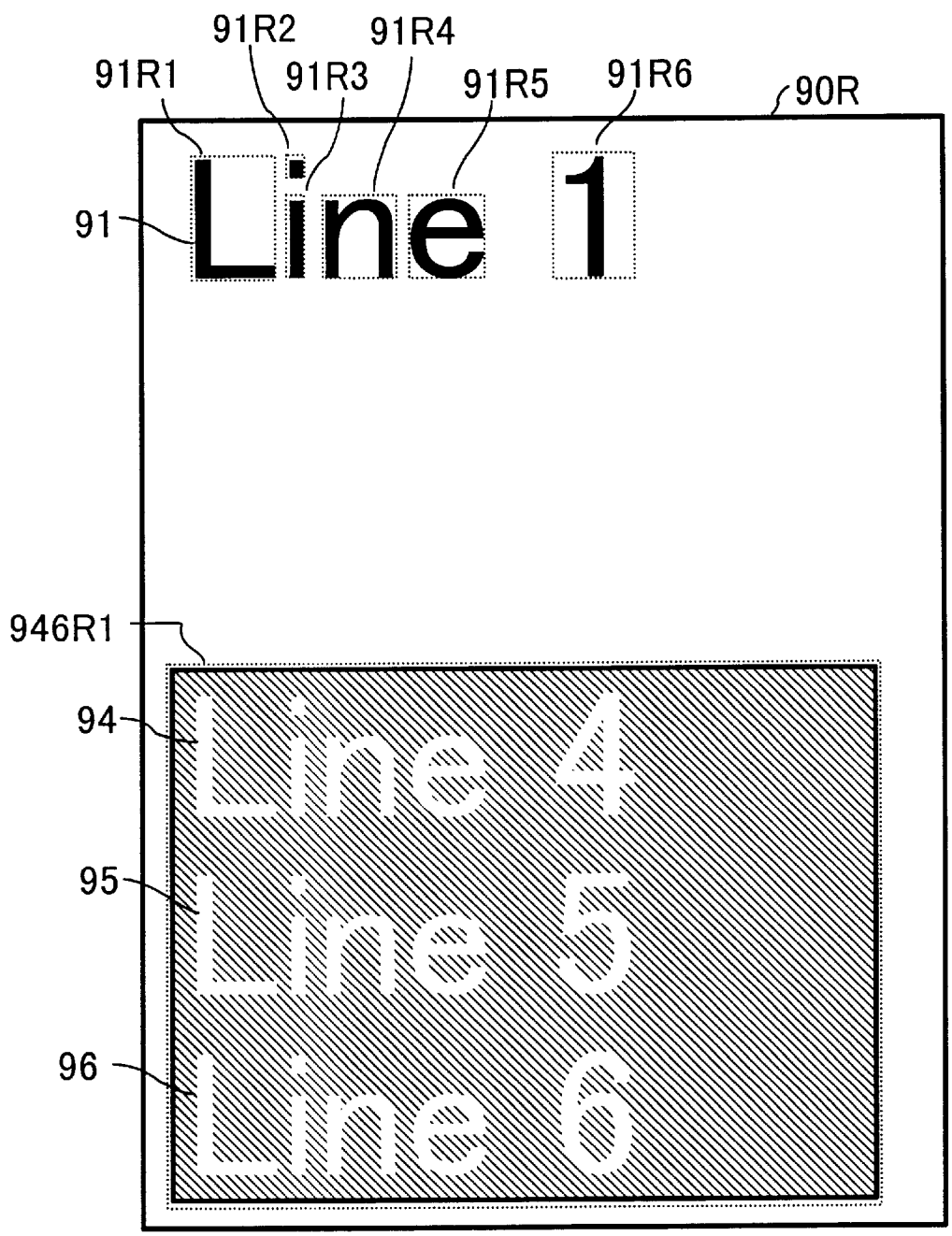
FIG. 10 is an illustration of rectangles that circumscribe around linked pixels on the bi-level red component plane.

FIG. 10 is an illustration of rectangles that circumscribes linked pixels with the same bi-level value 0(i.e., dark pixels) on the bi-level red plane 90R. With reference to FIG. 10, the rectangles 91R1 through 91R6, which are illustrated by dotted lines, circumscribe characters or character elements in the character string "LINE 1" 91R. A rectangle 946R1 circumscribes the background of the character strings "LINE 4" 94R, "LINE 5" 95R and "LINE 6" 96R.

In the step S14R of FIG. 3, the CPU 106 selects rectangles so that each of the selected rectangles circumscribes a character or an element of a character. To select these rectangles, the CPU 106 uses threshold values TH1 through TH7. The threshold values TH1 through TH7 may be constant values that are based on experimentation and embedded in the program code. In addition, these threshold values may be modified depending upon the type of characters or a language on the input image data. Further, these threshold values may be specified via an input device (e.g., the keyboard 122, the mouse 164, etc.) by the user of the program. Furthermore, these threshold values may be dynamically determined based on a statistical analysis of the input image data.

Figure 11:
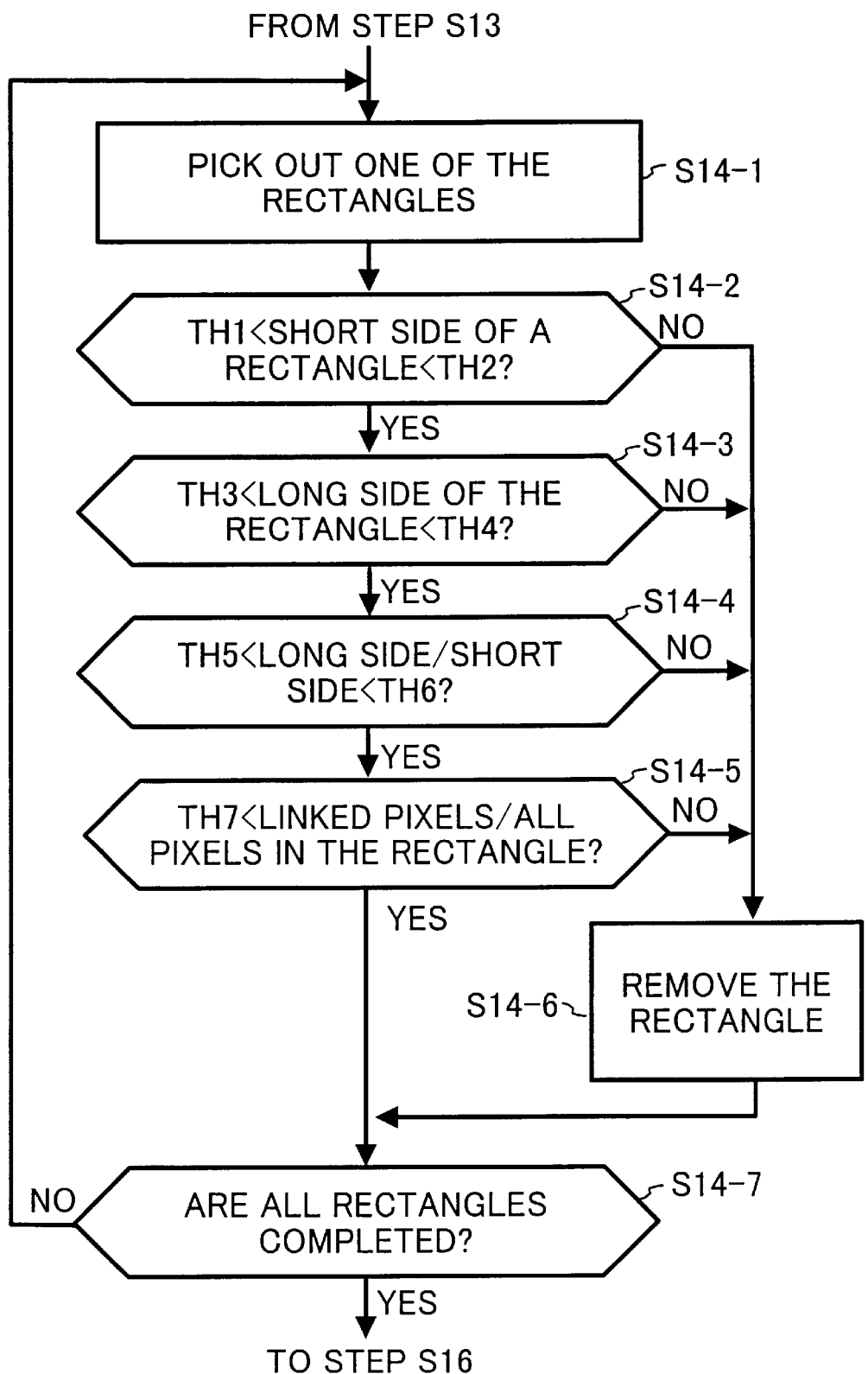
FIG. 11 is a flowchart illustrating operational steps for selecting rectangles.

FIG. 11 is a flowchart illustrating the operational steps for selecting rectangles (i.e., step 14 of FIG. 3). In step S14-1, the CPU 106 selects a rectangle among the plurality of rectangles that were generated in the previous step(i.e., rectangles 91R1 through 91R6, and 946R1 of FIG. 10) to determine whether the rectangle circumscribes a character or a character element. In step S14-2, the CPU 106 decides whether the short side of the rectangle is larger than the first threshold value TH1 and smaller than the second threshold value TH2. If yes, the process proceeds to step S14-3; however, if no, the process branches to step S14-6. For example, the rectangle 946R1 in FIG. 10 may not satisfy this criteria. That is, the short side of rectangle 946R1 may be determined by CPU 106 to be larger than the second threshold value TH2; accordingly the process branches to step S14-6. In step S14-3, the CPU 106 determines whether the long side of the rectangle is larger than the third threshold value TH3 and smaller than the fourth threshold value TH4. If this criterion holds true (i.e., yes in the step S14-3), then the process proceeds to step S14-4. However, if the determination is false, the process branches to the step S14-6.

In step S14-4, the CPU 106 determines whether the ratio of the long side of the rectangle to the short side is larger than a fifth threshold value TH5 and smaller than a sixth threshold value TH6. If the determination is true, the process proceeds to step S14-5; if the criteria are not met, the process branches to step S14-6. As an example, a rectangle circumscribing a graphic element is often slim, i.e., the ratio of the long side to the short side of the rectangle is large.

In step S14-5, the CPU 106 determines whether the ratio of the number of linked pixels with the same bi-level values in the rectangle to the number of all pixels in the rectangle is larger than the seventh threshold value TH7. If the determination is true, the process proceeds to step S14-7; otherwise, step S14-6 is performed.

In step S14-6, the CPU 106 deletes the rectangle because the rectangle is not considered as a circumscribing rectangle of a character or a character element. Next in step S14-7, the CPU 106 checks whether all of the rectangles have been processed. If indeed all the rectangles have been examined, the selection process is completed; thereafter, step S16 of FIG. 3 is executed. However, if there are rectangles to be processed, the process loops back to step S14-1.

As described above in the flowchart of FIG. 11, many of the rectangles circumscribing objects other than characters can be readily detected and removed by use of thresholds. As an example of a rectangle that circumscribes something other than a character or a character element involves a rectangle circumscribing an image noise, which on the whole is relatively small in comparison to characters. A rectangle circumscribing a graphic image is often relatively large in comparison with characters. Regarding a graphic element such as a line, a circle, a picture, and etc., the ratio of the long side to the short side of a circumscribing rectangle is often different from those of characters or character elements. A rectangle circumscribing a graphic element often has low a pixel density of linked pixels, i.e., the ratio of the number of linked pixels in the rectangle to the number of all pixels in the rectangle is often relatively small in comparison with the characters. Therefore, based on the sizes or dimensions of the rectangles, extraneous objects other than characters can be effectively removed.

When all processes are performed for all the rectangles in FIG. 10, the rectangle 946R1 is removed, and the rectangles 91R1, 91R2, 91R3, 91R4, 91R5 and 91R6 remain. Thus, characters and character elements on the relatively lighter colored background in the red component are extracted.

Referring back to FIG. 3, the steps S13G, S14G and S15G, and the steps S13B, S14B and S15B are respectively performed in substantially the same manner as the steps S13R, S14R and S15R. As a result, in the bi-level green component, rectangles circumscribing characters or character elements of the character strings "LINE 1" 91G and "LINE 3" 93G are selected. Likewise, in the bi-level blue component, rectangles circumscribing characters or character elements of the character strings "LINE 2" 92B are selected.

In the step S16, the CPU 106 merges the bi-level image data inside the selected rectangles in the red, green and blue components into merged bi-level image data. For merging the image data, the CPU 106 performs a logic operation among the bi-level color data for each of the same pixels, i.e., on the same coordinate position of the red, green and blue planes, inside the selected rectangles. Specifically, a logical AND operation is performed so that characters having bi-level values "0" are merged. When the CPU 106 performs a logical OR operation, characters having bi-level values "1" are merged.

In addition, if the dark pixel is expressed as "1", a logical OR operation is used for merging dark characters on a relatively light background. However, a logical AND operation is used for merging light characters (i.e., having a bi-level value "0") on a relatively dark background. Further, for extracting a specific color character, among other purposes, a logical NAND operation, a logical NOR operation, a logical EXCUSIVE OR operation, etc., and/or a combination thereof may be used as well.

Figure 12:
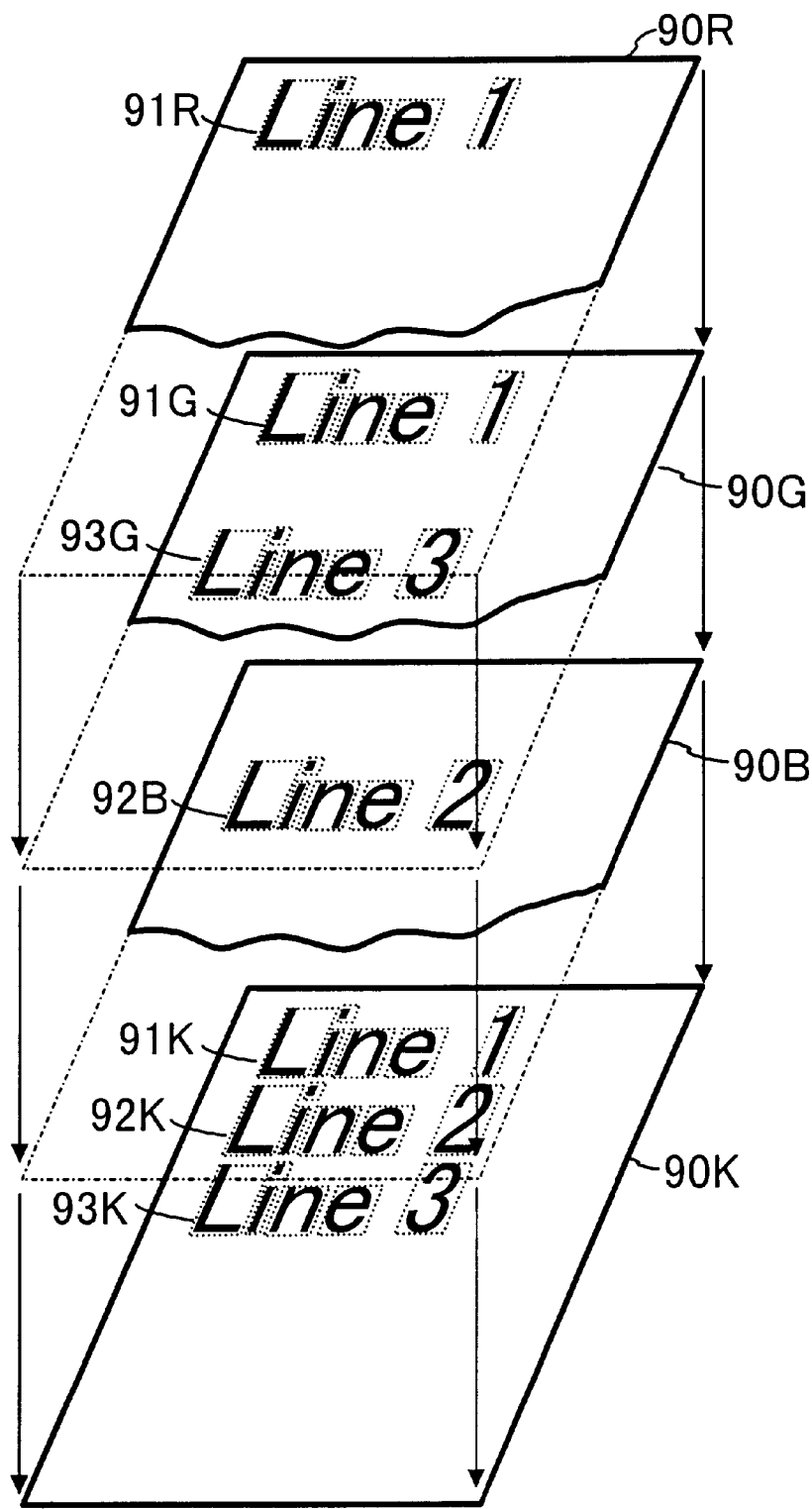
FIG. 12 is an illustration of a merge operation of the selected color components.

FIG. 12 is an illustration for explaining the merge operation using a logical OR operation on the selected color components inside the selected rectangles. The selected color component data are illustrated as the selected red component 91R in the red plane 90R, the green components 91G and 93G in the green plane 90G, and the blue component 92B in the blue plane 90B. A merged plane 90K has character strings 91K, 92K and 93K that have been obtained by a logical AND operation among the bi-level color data in the red, green and blue planes. The merged plane 90K also have merged rectangles illustrated by dotted lines around the merged characters. Thus, the characters on the relatively lighter background in the document 90 of FIG. 3 are extracted.

Figure 13:
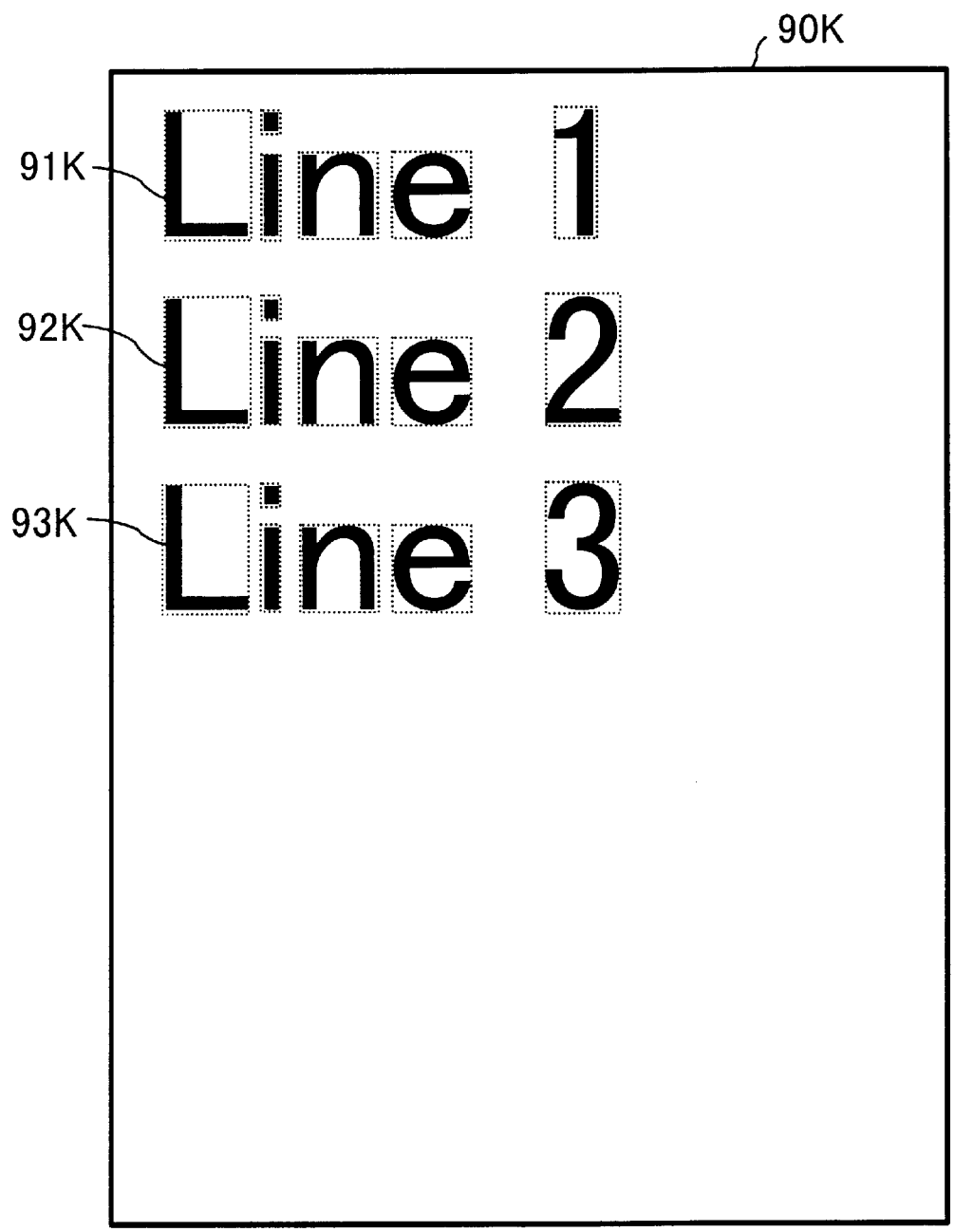
FIG. 13 is a diagram illustrating color character strings extracted from the document of FIG. 4 according to an embodiment of the present invention.

FIG. 13 is a diagram illustrating character strings 91K, 92K and 93K that have been extracted from the document of FIG. 3 according to an embodiment of the present invention. The extracted characters may be output to another process or software, such as, a character recognition program, an image editing program, etc. The data of the merged rectangle illustrated by dotted lines in FIG. 13 may also be utilized for those programs.

Referring back to FIG. 3, the character extracting method of the present invention further provides the operational step S17. In the step S17, the CPU 106 extracts regions of character strings, such as regions of words, regions of sentences, regions of paragraphs, etc., to enhance the usefulness of the extracted characters.

Figure 14:
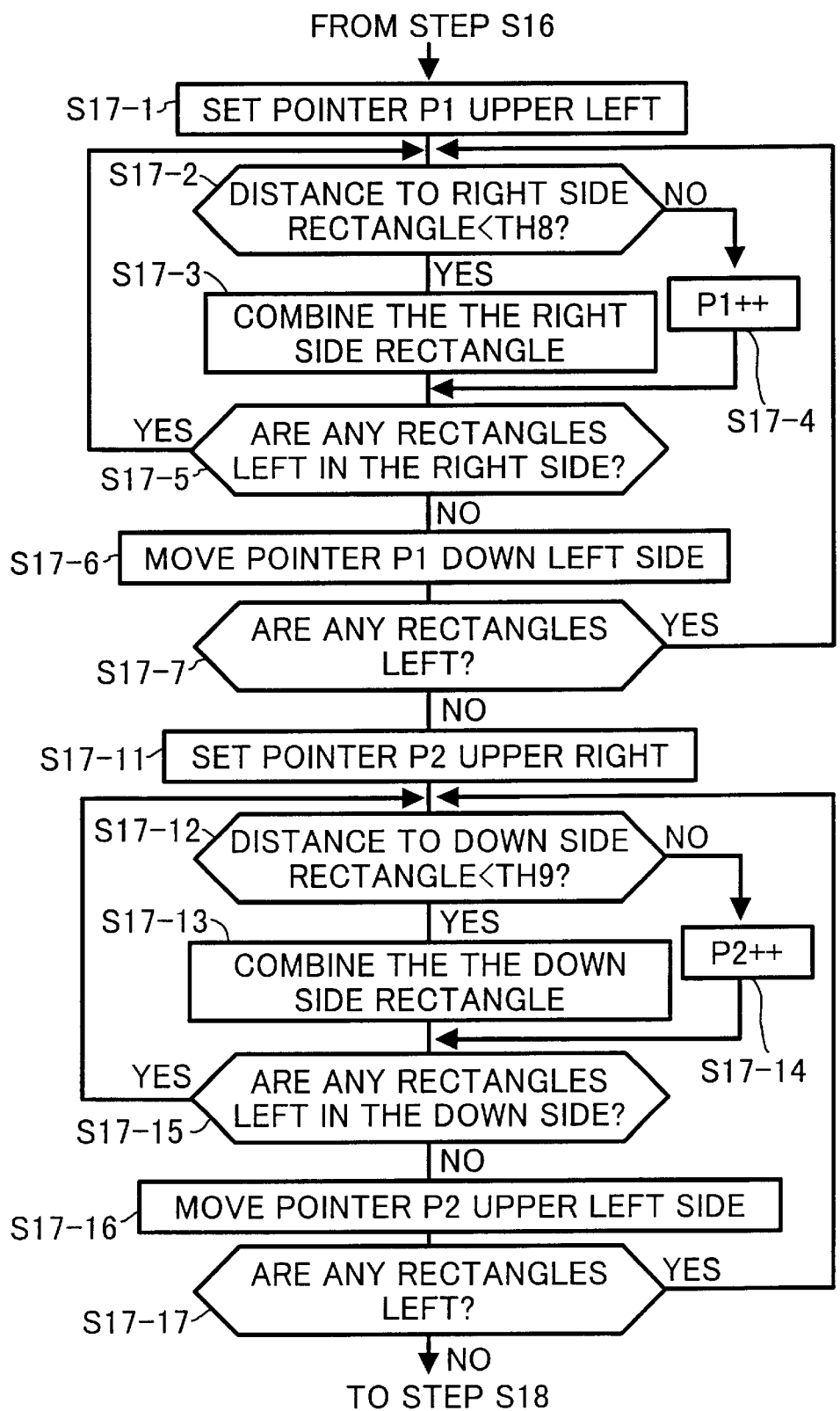
FIG. 14 is a flowchart illustrating operational steps for extracting a region of character string.

FIG. 14 is a flowchart illustrating the operational steps for extracting a region of a character string associated with step S17 of FIG. 3. In step S17-1, the CPU 106 sets a pointer P1 at an upper leftmost rectangle in the merged plane 90K of FIG. 13 for sequentially scanning the merged rectangles. In step S17-2, the CPU 106 determines whether the distance from the pointed rectangle to a right side rectangle is smaller than a threshold value TH8. As an example, for extracting regions of words of English, German, French, Spanish, etc., the threshold value TH8 may be set to be a slightly greater value than the typical spacing between letters in a word. In addition, the threshold value TH8 may also be proportional to the sizes of the letters in the merged plane 90K of FIG. 13. For extracting regions of sentences in English, German, French, Spanish, etc., the threshold value TH8 may be determined as a value that is a little greater than the widths of the letters. This approach is also applicable to extracting regions of sentences in Japanese, Chinese, Korean, and etc.

If the determination in step S17-2 is true, the process proceeds to step S17-3; otherwise, the process branches to step S17-4. The CPU 106, as in step S17-3, combines the pointed rectangle and the right side rectangle. In step S17-4, the CPU 106 increments the pointer P1 to point a next right side rectangle.

Next, the CPU 106 determines whether any rectangles are left in the right side of the pointer P1, per step S17-5. If any rectangles remain, , the process returns to step S17-2, otherwise, the process proceeds to step S17-6. In step S17-6, the CPU 106 moves the pointer P1 to point a left side rectangle in a row below the current row. Next, the CPU 106, as in step S17-7, determines whether any rectangles are left in the position indicated by pointer P1. The process returns to step S17-2 if there are rectangles remaining. However, if no rectangles remain, step S17-11 is performed.

Steps S17-11 to S17-17 permit extraction of regions of vertically aligned character strings; such as, horizontally oriented words or sentences and Japanese or Chinese sentences written in a vertical manner. In step S17-11, the CPU 106 sets a pointer P2 at an upper rightmost rectangle of the merged plane 90K of FIG. 13 for scanning the merged rectangles. The CPU 106 determines, per step S17-12, whether the distance from the pointed rectangle to a down side rectangle is smaller than a threshold value TH9. The threshold value TH9 may be determined in a similar manner to that of the threshold value TH8. If the determination is true, the process proceeds to step S17-13; otherwise, the process branches to step S17-14. In step S17-13, the CPU 106 combines the pointed rectangle and the down side rectangle. Next, the CPU 106 increments the pointer P2 to point a down side rectangle, per step S17-14.

In step S17-15, the CPU 106 determines whether any rectangles are left in the down side of the pointer P2; if yes, the process returns to step S17-12. However, if no rectangles are left, step S17-16 is executed. In step S17-16, CPU 106 moves the pointer P2 to point an upside rectangle in a column left of the current column. The CPU 106 determines, as in step S17-17, whether any rectangles are left in the position indicated by the pointer P2. Upon determining that there are rectangles remaining, step S17-12 is performed. Otherwise, the process proceeds to step S18 in FIG. 3.

Figure 15:
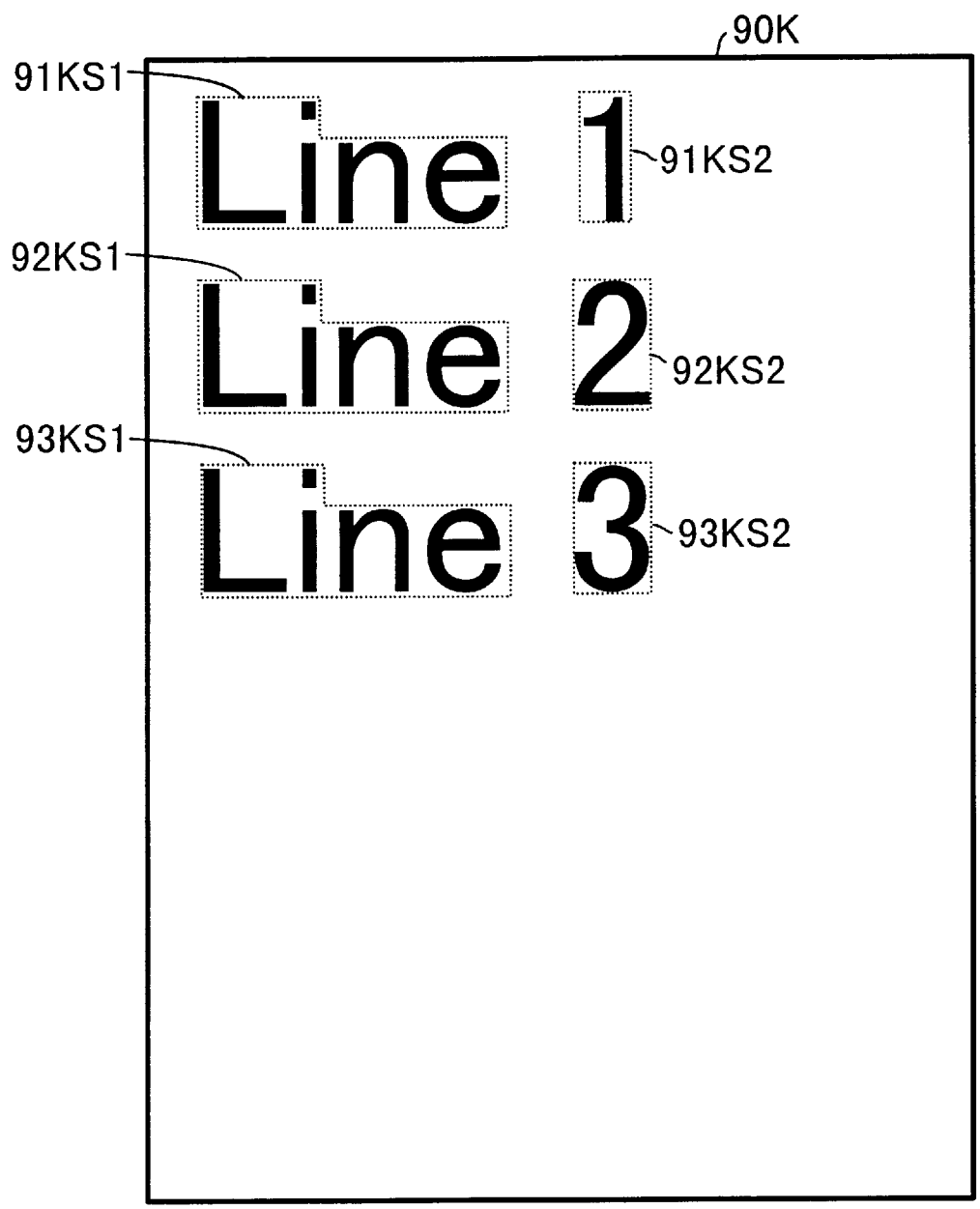
FIG. 15 is a diagram illustrating regions of character strings extracted from the document of FIG. 4.

FIG. 15 is a diagram illustrating regions of character strings that are extracted from the document of FIG. 4 by the above-described method. In FIG. 15, each polygon 91KS1, 92KS1 and 93KS1, and rectangles 91KS2, 92KS2 and 93KS2 in the merged plane 90K are generated to circumscribe a character string. Thereafter, a character recognition program or the like, can utilize image data surrounded by those polygons and rectangles as character strings.

As described above, characters and character strings in plural colors on relatively light color background can be readily extracted. Next, a method for extracting characters and character strings in plural colors on a relatively dark color background is discussed.

Figure 16:
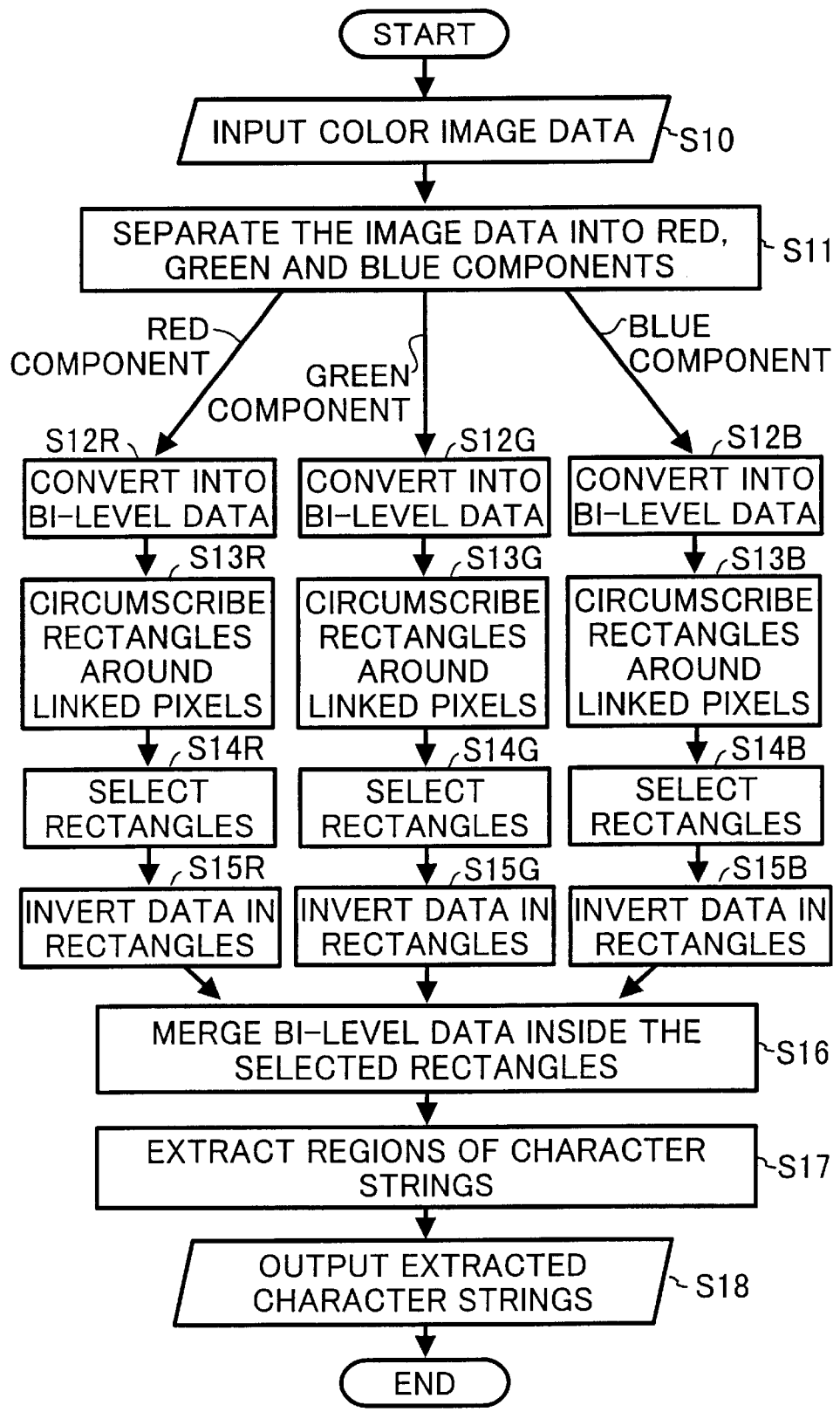
FIG. 16 is a flowchart illustrating operational steps for practicing a character extracting method for characters on a dark background according to an embodiment of the present invention.

FIG. 16 is a flowchart illustrating operational steps for practicing a character extracting method for characters on a dark background according to an embodiment of the present invention. In FIG. 16, the steps that are substantially the same as those in FIG. 3 are denoted by the same reference numerals; as a result, a detailed description of these steps is omitted. Referring to FIG. 16, in steps S13R, S13G and S13B, when the CPU 106 circumscribes rectangles around linked pixels with the same (or identical) bi-level value in the bi-level red component, the CPU 106 circumscribes rectangles around linked pixels having the same bi-level value "1" instead of "0".

Figure 17:
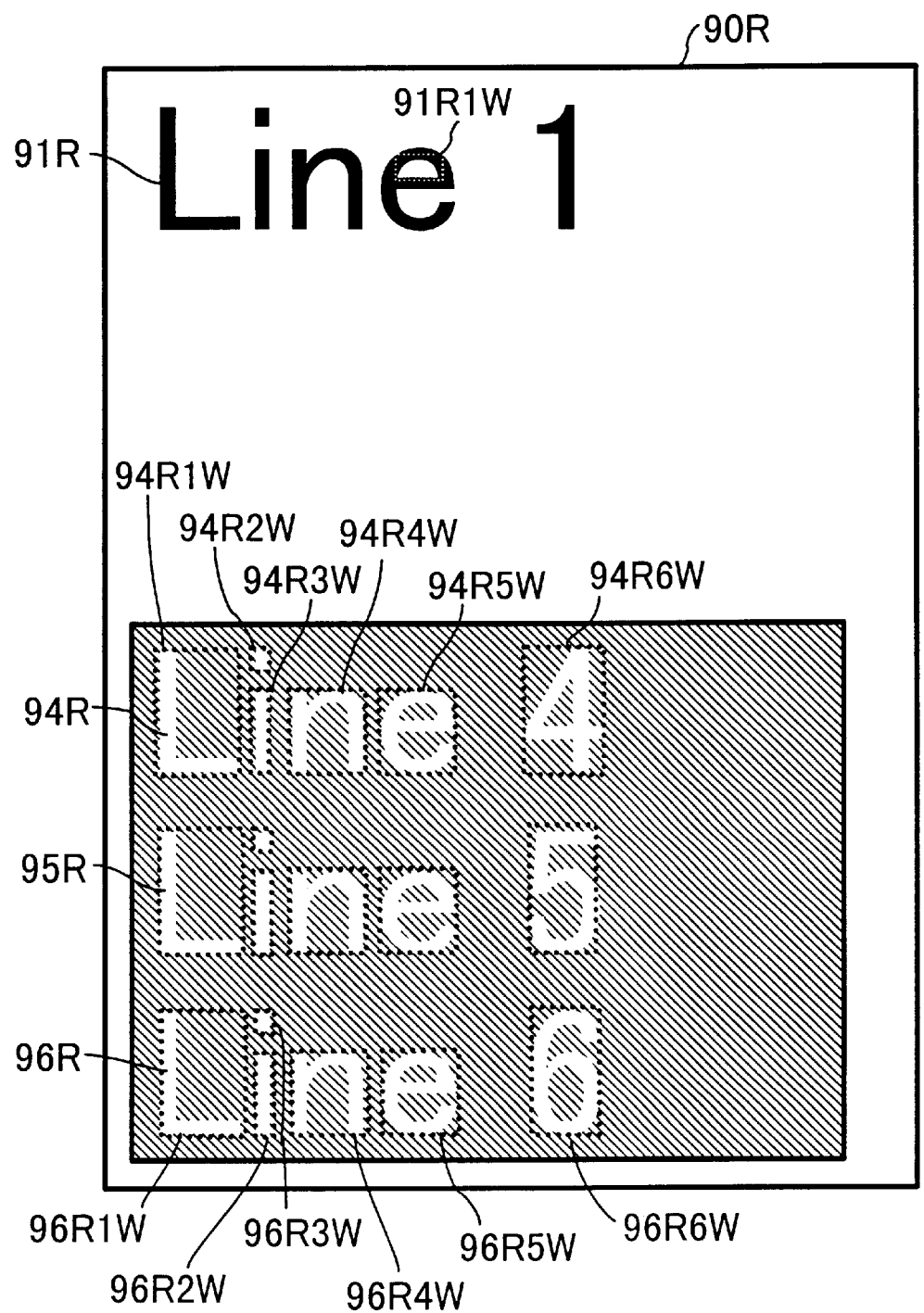
FIG. 17 is an illustration of rectangles that circumscribes linked pixels having the same light bi-level value in the red component.

FIG. 17 is an illustration of rectangles that circumscribe linked pixels with the same bi-level value 1 in the bi-level red plane 90R. With reference to FIG. 17, rectangles 94R1W through 94R6W illustrated dotted lines circumscribe characters or character elements in the character string "LINE 4" 94R. Rectangles 96R1W through 96R6W, as illustrated by dotted lines, circumscribe characters or character elements in the character string "LINE 6" 96R. Likewise, characters in the character string "LINE 5" 95R are circumscribed by rectangles; however, reference numerals are omitted to not obscure the drawing. A rectangle 91R1W circumscribes a part of the background under the character "e" in the character string "LINE 1" 91R.

Referring back to FIG. 16, in steps S14R, S14G and S14B, the CPU 106 selects rectangles such that the selected rectangles circumscribe a character or an element of a character in substantially the same manner as the process in FIG. 11. As a result, in the bi-level red component, rectangles circumscribing characters or character elements of the character strings "LINE 4" 94R, "LINE 5" 95R and "LINE 6" 96R are selected. Likewise, in the bi-level green component, rectangles circumscribing characters or character elements of the character strings "LINE 4" 94G, "LINE 5" 95 and "LINE 6" 96G are selected Further, in the bi-level blue component, rectangles circumscribing characters or character elements of the character strings "LINE 5" 95G and "LINE 6" 96G are selected. The rectangle 91R1W in FIG. 17 circumscribes a part of the background under the character "e", and similar rectangles may exist in the other color components. However, those relatively small rectangles may be deleted by the selecting process of the step S14, which is detailed in FIG. 11.

After the CPU 106 selects rectangles around linked pixels having the same bi-level value "1" in the color components, as in step S15R, the CPU 106 inverts all pixel data inside the rectangles. Likewise, in steps S15G and S15B, the CPU 106G and CPU 106B invert all pixel data inside the rectangles, or perform a logical NOT operation; i.e., bi-level value "1" is inverted to "0", and bi-level value "1" is inverted to "0".

Figure 18:
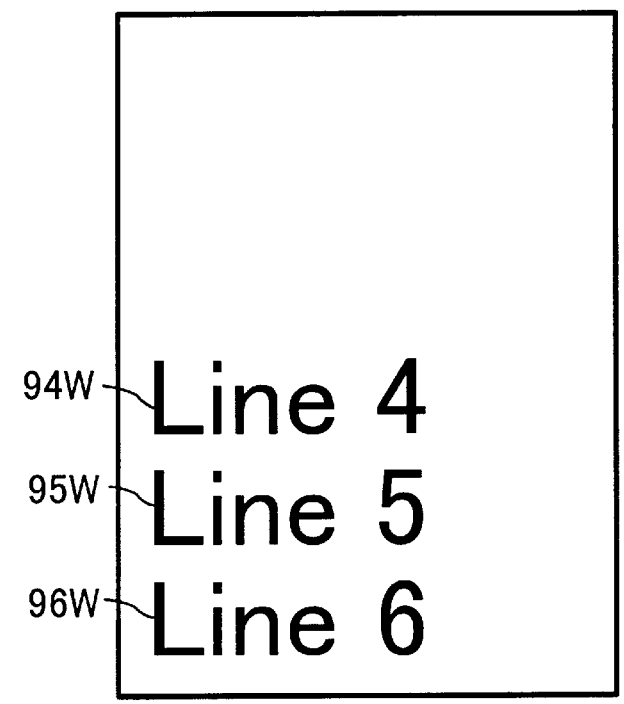
FIG. 18 is a diagram illustrating extracted characters on the relatively dark backgrounds in the document of FIG. 4.

In step S16, the CPU 106 merges the inverted bi-level image data inside the selected rectangles in the red, green and blue component into merged bi-level image data. For merging the image data, the CPU 106 performs a logical AND operation among the inverted bi-level color data inside the selected rectangles in the red, green and blue components. FIG. 18 is a diagram illustrating extracted characters 94W, 95W and 96W, which are on a relatively dark background, from the color data of the document of FIG. 4. Referring back to FIG. 16, in the step S17, the CPU 106 extracts regions of character strings, such as regions of words, sentences, etc.

Figure 19:
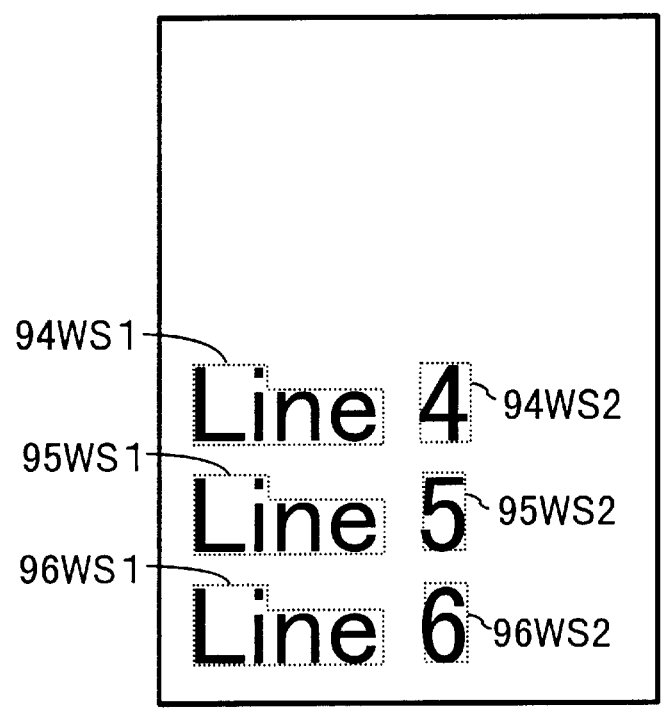
FIG. 19 is a diagram illustrating regions of relatively light color character strings extracted from the color data of the document of FIG. 4.

FIG. 19 is a diagram illustrating regions of relatively light color character strings as dotted polygons 94WS1, 94WS2, and 95WS1, and dotted rectangles 95WS2, 96WS1 and 96WS2 that are extracted from the color data of the document of FIG. 4.

Figure 20A:
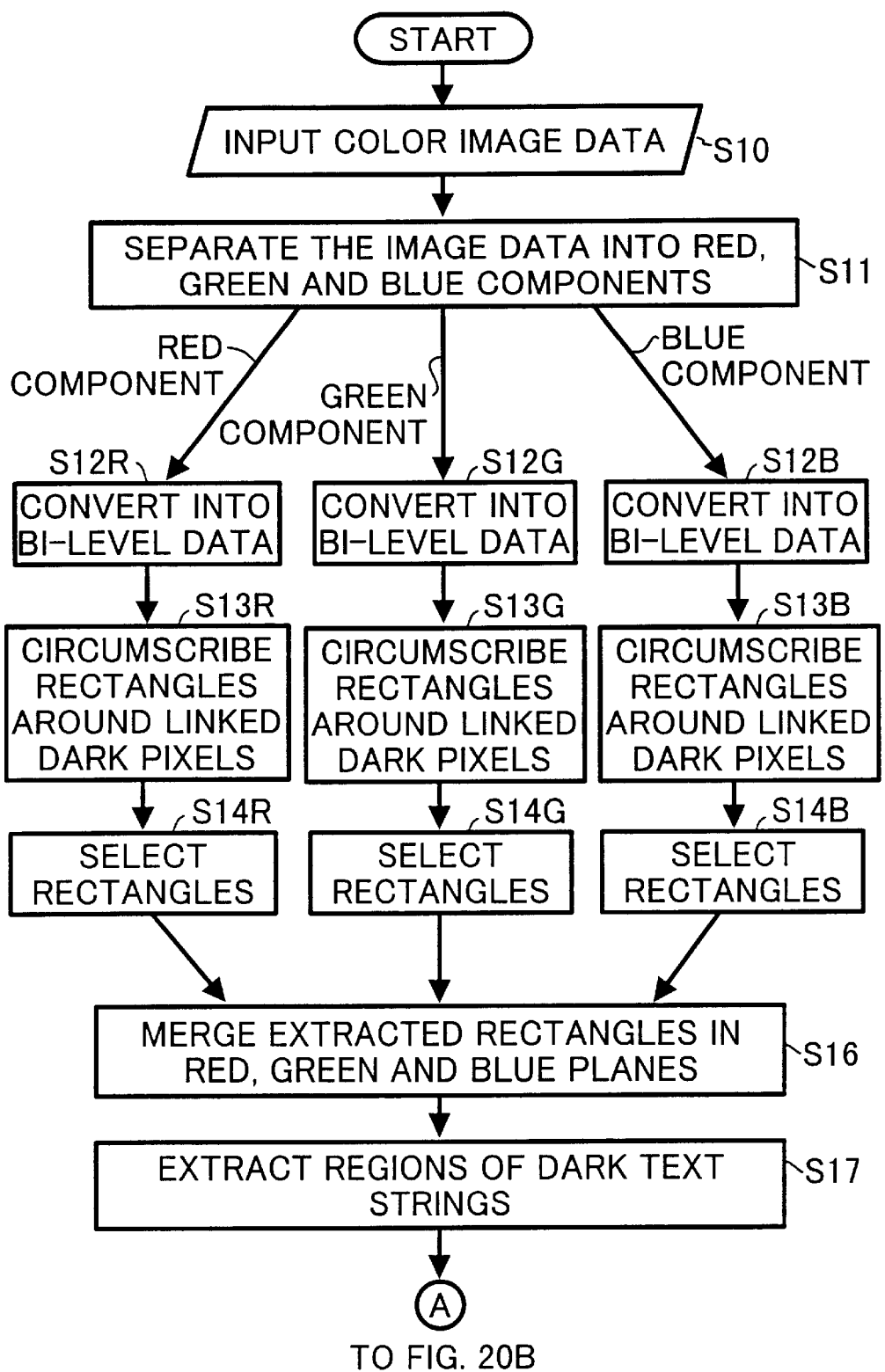
FIGS. 20A and 20B is a flowchart illustrating operational steps for practicing a method for extracting both dark and light characters according to an embodiment of the present invention.
Figure 20B:
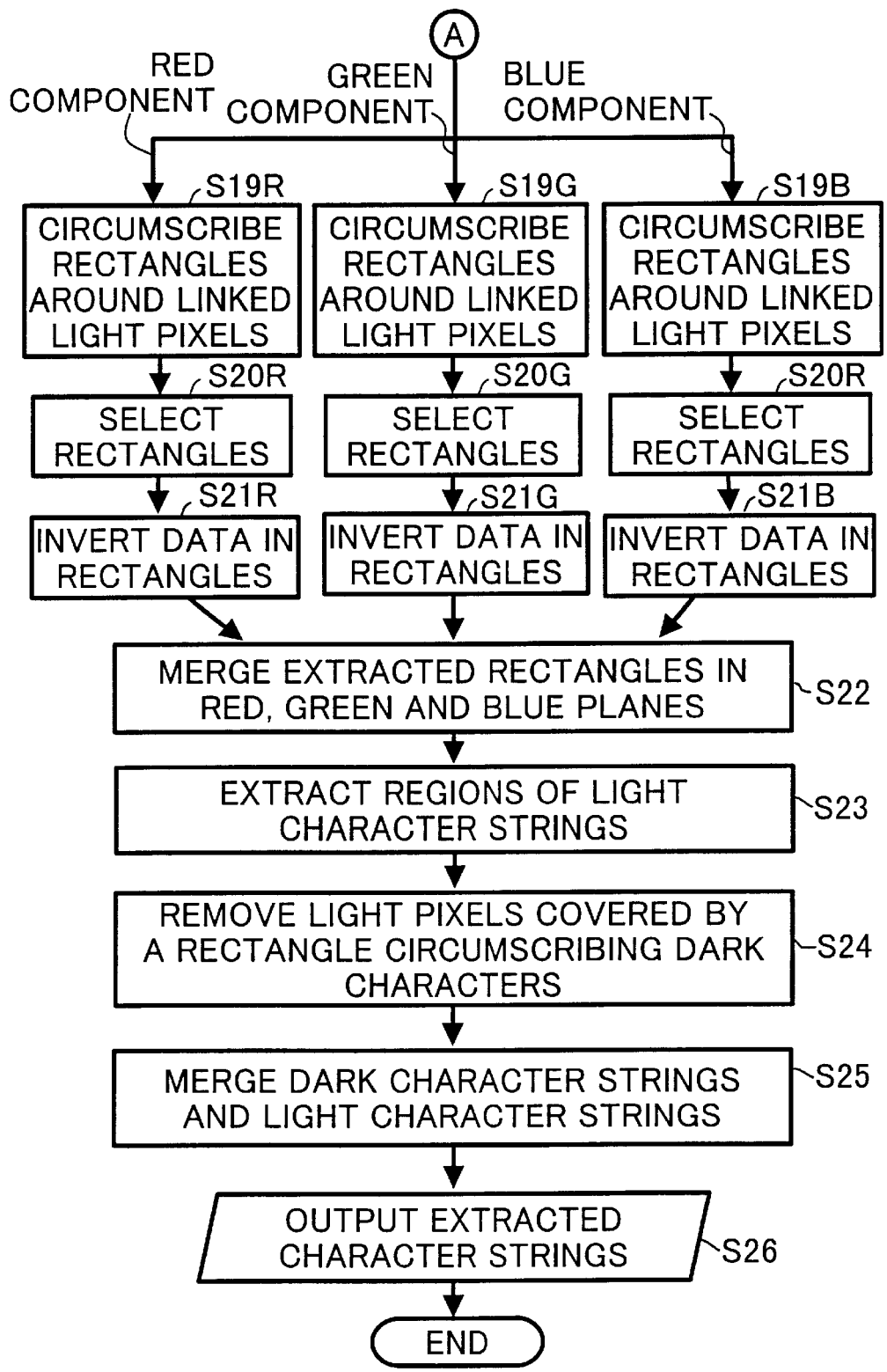

FIGS. 20A and 20B show a flowchart of the operational steps for practicing a character extracting method according to an embodiment of the present invention. In FIGS. 20A and 20B, the steps that are substantially the same as those in FIG. 3, in which the similar steps are denoted by the same reference numerals. In step S11, the image data is separated into red, green and blue components. Further processing of the individual component is performed beginning with steps S12R, S12G and S12B. In step S12R, the individual component is converted into bi-level data. In the step S13R, each of plural linked dark pixels (i.e., optically darker pixels that have the bi-level value "1") is circumscribed with a rectangle. The circumscribed rectangles, as in step S14R, are selected such that each of the selected rectangles circumscribes a character or an element of a character. The steps S12G, S13G and S14G, and the steps S12B, S13B and S14B are respectively performed in substantially the same manner as the steps S12R, S13R and S14R.

Next, the bi-level data inside the selected rectangles in the red, green and blue components are merged, per step S16. In step S17, the merged bi-level data is optionally linked as character strings. In step S19R, each of the plural linked light pixels (i.e., optically lighter pixels that have the bi-level value "1") is circumscribed with a rectangle. In step S20R, the circumscribed rectangles are selected such that the selected rectangles circumscribe a character or an element of a character. In step S21R, all the pixel data in the selected rectangles are inverted. The steps S19G, S20G and S21G, and the steps S19B, S20B and S21B are respectively performed in substantially the same manner as the steps S19R, S20R and S21R.

In step S22, the inverted bi-level data inside the selected rectangles in the red, green and blue components are merged. In step S23, an extracting operation of regions that circumscribe character strings is optionally performed by merging the rectangles that have obtained by the above steps. Next, inverted light pixels that are covered by a rectangle circumscribing dark linked pixels are removed, per step S24. In step S25, the merged dark linked pixels and the merged inverted light linked pixels are further merged. The extracted character strings are then output, as in step S26.

Figure 21:
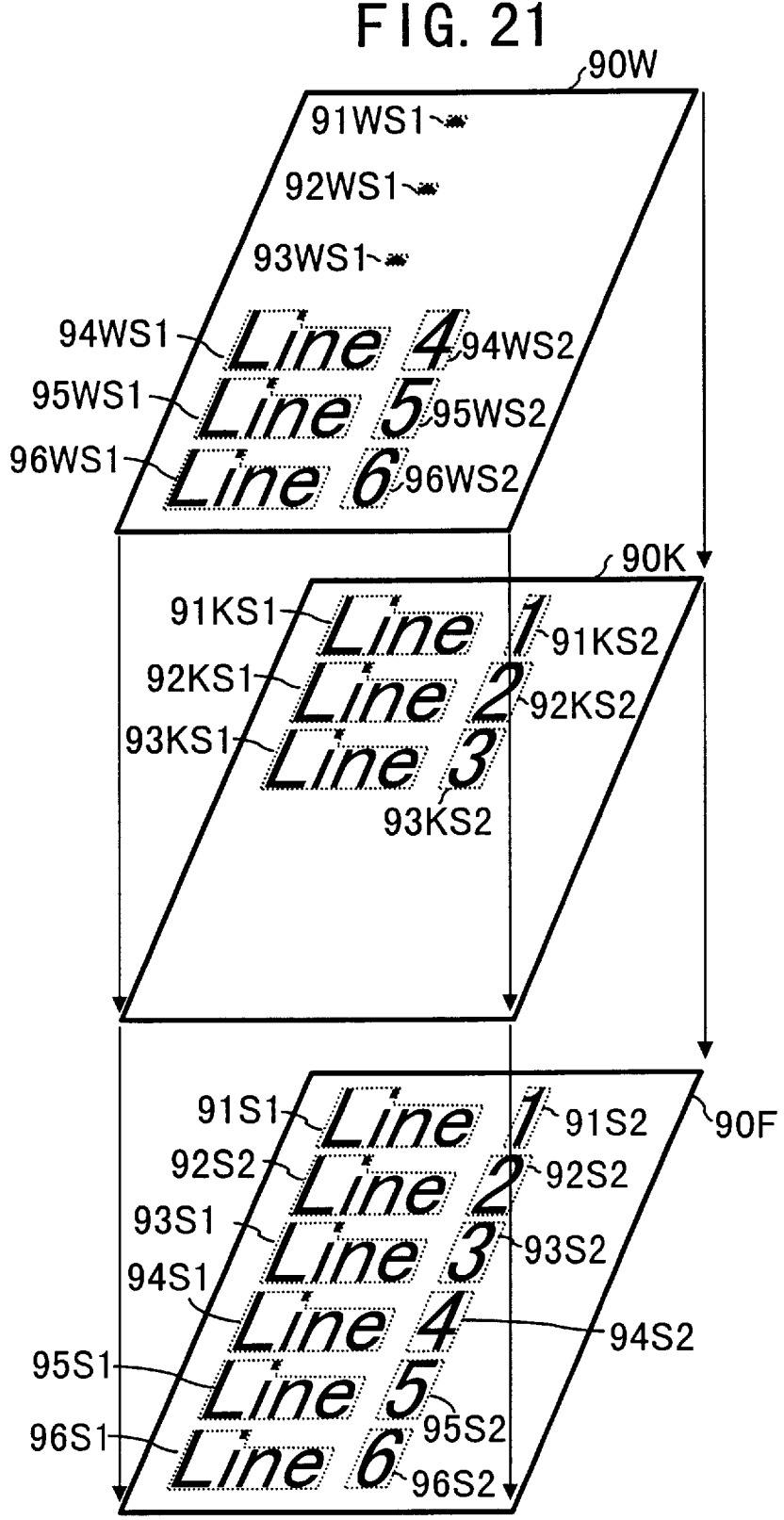
FIG. 21 is an illustration of a merge operation of dark color characters and light color characters.

FIG. 21 is an illustration of the merging operation of dark color characters and light color characters. After the CPU 106 has performed step 17 of FIG. 20A with respect to the image data of FIG. 4, polygons 91KS1, 92KS1 and 93KS1, and rectangles 91KS2, 92KS2 and 93KS2, in which the circumscribed dark character strings are extracted, is illustrated on the second plane 90K. Further, after step 23 (in FIG. 20B), polygons 94WS1, 95WS1 and 96WS1, and rectangles 94WS2, 95WS2 and 96WS2, in which circumscribed inverted light character strings are extracted, are shown on a first plane 90W. Additionally, rectangles 91WS1, 92WS1 and 93WS1, in which circumscribed portions of light characters may be extracted depending upon the selecting conditions for rectangles in the steps S20R, S20G and S20B, are on the first plane 90W.

Figure 22:
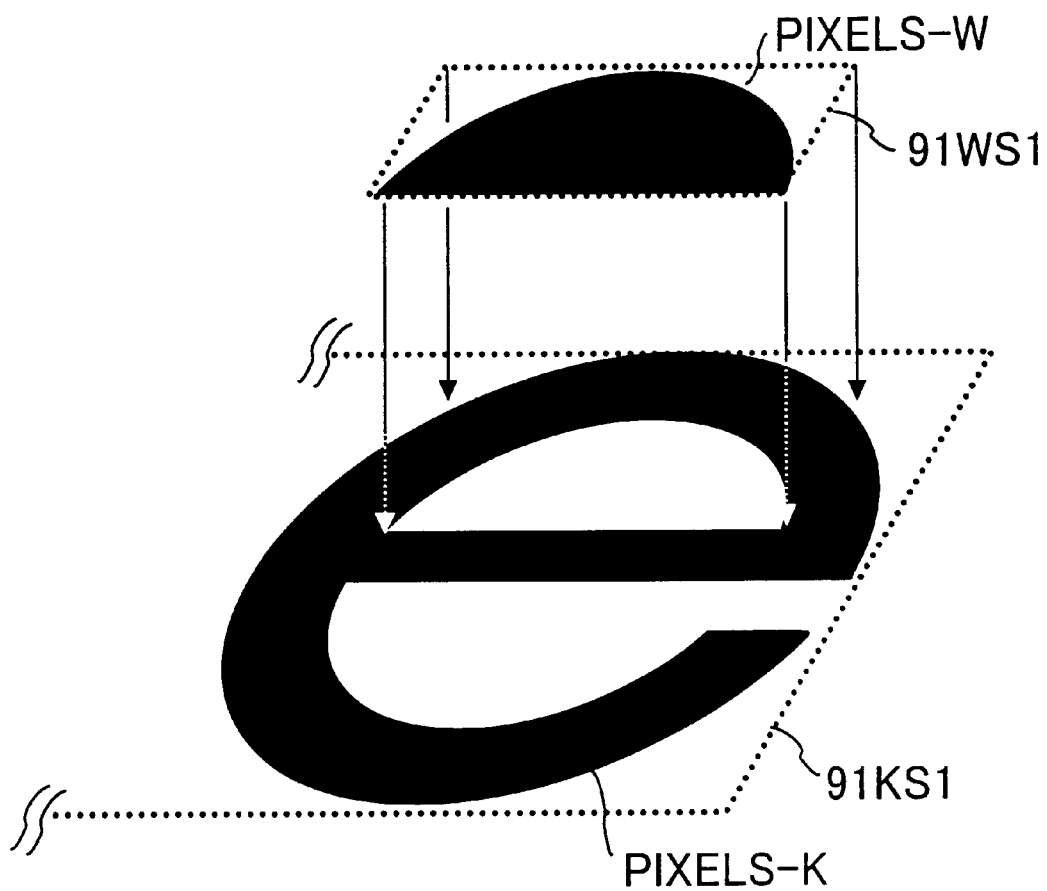
FIG. 22 is an illustration of a removal operation of light linked pixels covered by a rectangle circumscribing dark linked pixels.

FIG. 22 is an illustration of the removal operation of light linked pixels that are covered by a rectangle circumscribing dark linked pixels. In FIG. 22, the rectangle 91WS1 circumscribes the inverted linked light pixels (denoted as PIXELS-W). The polygon 93WKS1 circumscribes the linked dark pixels (denoted as PIXELS-K). The inverted linked light pixels PIXELS-w is located inside the polygon 91WKS1; therefore, CPU 106 removes the pixels PIXELS-w, per step S24 of FIG. 20. In addition, other inverted linked light pixels in the rectangles 92WS1 and 93WS1 as illustrated in FIG. 21 are removed as well.

Finally, merged polygons 91S1, 92S1, 93S1, 94S1, 95S1 and 96S1, and rectangles 91S2, 92S2, 93S2, 94S2, 95S2, and 96S2, in which circumscribed dark and light character strings are extracted, are illustrated on a third plane 90F in FIG. 21.

Figure 23:
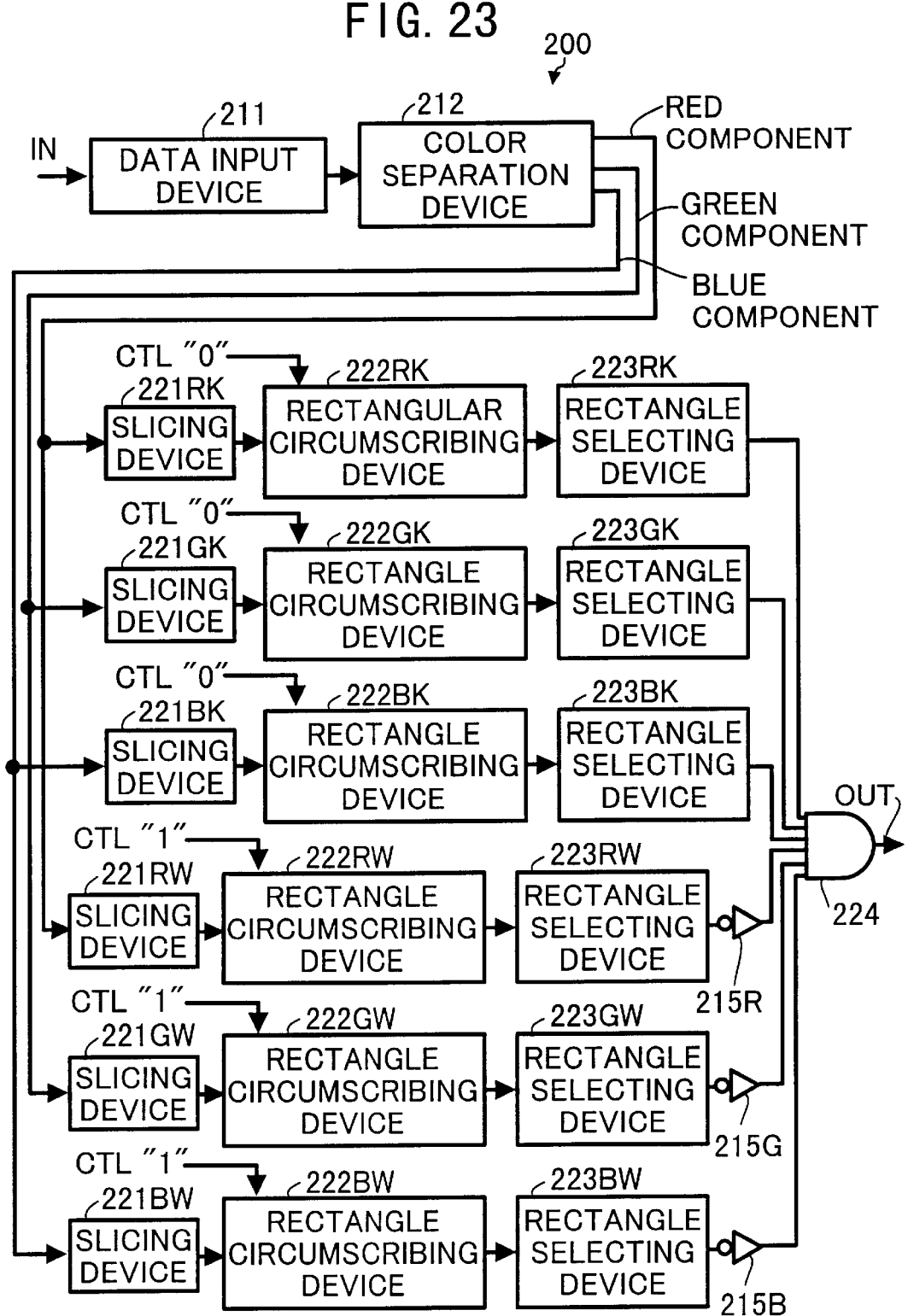
FIG. 23 is a schematic block diagram of a color character extraction apparatus as an example configured according to an embodiment of the present invention.

FIG. 23 is a schematic block diagram of an exemplary color character extraction apparatus 200 that is configured according to an embodiment of the present invention. In FIG. 23, the color character extraction apparatus 200 includes a data input device 211, a color separation device 212, slicing devices 221RK, 221GK, 221BK, 221RW, 221GW and 221BW. Further, the apparatus 200 includes rectangle circumscribing devices 222RK, 222GK, 222BK, 222RW, 222GW and 222BW, rectangle selecting devices 223RK, 223GK, 223BK, 223RW, 223GW and 223BW, inverters 215R, 215G and 215B, and a six input logical AND gate 224.

The data input device 211 receives input image data. The color separation device 212 separates the input image data into a plurality of color components such as, red, green and blue components. Each of the separated color components of a pixel has a multi-level value. The separated red data is output to the slicing device 221RK and 221RW. In addition, the green data is input to the slicing device 221GK and 221GW, while the blue data is input to the slicing device 221BK and 221BW. Each of the slicing devices 221RK, 221GK, 221BK, 221RW, 221GW and 221BW converts the input multi-level data into bi-level data, and outputs the bi-level data to the rectangle circumscribing devices 222RK, 222GK, 222BK, 222RW, 222GW and 222BW.

Each of the rectangle circumscribing devices 222RK, 222GK, 222BK, 222RW, 222GW and 222BW has a control terminal denoted as CTL. When the control terminal CTL is clamped to "0", the rectangle circumscribing device circumscribes each of linked pixels with bi-level data "0" (i.e., dark pixel). When the control terminal CTL is clamped to "1", the rectangle circumscribing device circumscribes each of the linked pixels with bi-level data "1" (i.e., light pixel). Then, each of the rectangle circumscribing devices 222RK, 222GK, 222BK, 222RW, 222GW and 222BW outputs the rectangle data and the circumscribed linked bi-level pixel data to the rectangle selecting devices 223RK, 223GK, 223BK, 223RW, 223GW and 223BW.

The rectangle selecting devices 223RK, 223GK, 223BK, 223RW, 223GW and 223BW select the input rectangles according to predetermined references. These references may include, for example, the lengths of the short side and the long side of the rectangles, the ratios of the long side to the short side of the rectangles, and the ratios of the number of linked pixels that have the same bi-level value to the number of all the pixels in the rectangle. Further, the rectangle selecting devices 223RK, 223GK and 223BK output the linked bi-level pixel data with bi-level value "0" inside the selected rectangles to the logical AND gate 224. The rectangle selecting devices 223RW, 223GW and 223BW output the linked bi-level pixel data with the bi-level value "1" inside the selected rectangles to the inverters 215R, 215G and 215B. These inverters 215R, 215G and 215B invert the input data; i.e., from a value "1" to a value "0", and vice versa. The logical AND gate 224 outputs a logical AND of the six input to an external device as extracted character data.

As described, the color character extraction apparatus 200 provides six sets of the slicing device, the rectangular circumscribing device and the rectangle selecting device. However, the color character extraction apparatus 200 can achieve a color character extracting operation provided with one set of the slicing device, the rectangular circumscribing device. In such the structure, the apparatus 200 performs a color character extraction by sequentially processing of the dark pixels and light pixels each in the separated color components.

As described above, the novel method, computer program product and apparatus for extracting characters from color image data of the present invention can simultaneously extract characters having a plurality of colors. Further, the novel method, computer program product and apparatus for extracting characters from color image data of the present invention can extract a plurality of white or relatively light color characters on a relatively dark colored background.

Obviously, numerous modifications and variations of the present invention are possible in light of the above teachings. For example, features described for certain embodiments may be combined with other embodiments described herein. It is therefore to be understood that within the scope of the appended claims, the invention may be practiced otherwise than as specifically described herein.

What is claimed as new and is desired to be secured by Letters Patents of the United States:

1. A method for extracting characters from color image data comprising:
   inputting color image data;
   separating the input color image data into a plurality of color component data;
   converting each of the plurality of color component data into respective bi-level color component data;
   circumscribing rectangles around linked pixels having identical bi-level values corresponding to the plurality of bi-level color component data;
   selecting the circumscribed rectangles based on size of the circumscribed rectangles by determining a ratio of number of the linked pixels to number of all pixels inside the rectangle;
   merging the bi-level color component data inside the selected circumscribed rectangles; and
   outputting the merged bi-level image data.

2. A method for extracting characters from color image data comprising:
   inputting color image data;
   separating the input color image data into a plurality of color component data;
   converting each of the plurality of color component data into respective bi-level color component data;
   selectively circumscribing rectangles around linked pixels having identical bi-level values associated with optically dark values corresponding to the plurality of bi-level color component data;
   selectively circumscribing rectangles around linked pixels having identical bi-level values associated with optically light values corresponding to the plurality of bi-level color component data;
   selecting the circumscribed rectangles based on size of the circumscribed rectangles;
   inverting the bi-level color component data inside the selected rectangles circumscribing the linked optically dark value pixels and the selected rectangles circumscribing the linked optically light value pixels;
   merging the bi-level color component data and inverted bi-level color component data inside the selected rectangles; and
   outputting the merged bi-level image data.

3. The method according to claim 2, further comprising:
   determining whether one of the selected rectangles is inside another one of the selected rectangles; and
   deleting inverted bi-level color component data inside the selected rectangles based upon the determining step.

4. The method according to claim 2, wherein the color component data in the separating step comprise red component data, green component data and blue component data.

5. The method according to claim 2, wherein the color component data in the separating step comprise cyan component data, magenta component data and yellow component data.

6. The method for extracting characters according to claim 2, wherein the separating step comprises weighting the color component data based upon a predetermined ratio.

7. The method according to claim 2, wherein the merging step comprises performing a logic operation.

8. The method according to claim 2, wherein the selecting step comprises determining a ratio of number of the linked pixels to number of all pixels inside the rectangle.

9. The method according to claim 2, wherein the selecting rectangle step comprises determining a ratio of a short side length of the rectangle to a long side length of the rectangle.

10. The method for according to claim 2, further comprising:

combining the selected circumscribed rectangles such that the combined contour circumscribes a character string; and outputting image data inside the combined contours.

11. A computer-readable medium carrying one or more sequences of one or more instructions for extracting characters from color image data, the one or more sequences of one or more instructions including instructions which, when executed by one or more processors, causes the one or more processors to perform the steps of:

inputting color image data;

separating the input color image data into a plurality of color component data;

converting each of the plurality of color component data into respective bi-level color component data;

selectively circumscribing rectangles around linked pixels having identical bi-level values associated with optically dark values corresponding to the plurality of bi-level color component data;

selectively circumscribing rectangles around linked pixels having identical bi-level values associated with optically light values corresponding to the plurality of bi-level color component data;

selecting the circumscribed rectangles based on size of the circumscribed rectangles;

inverting the bi-level color component data inside the selected rectangles circumscribing the linked optically dark value pixels and the selected rectangles circumscribing the linked optically light value pixels;

merging the bi-level color component data and inverted bi-level color component data inside the selected circumscribed rectangles; and outputting the merged bi-level image data.

12. An apparatus for extracting characters from color image data comprising:

a data input device configured to input color image data;

a color separation device configured to separate the input color image data into a plurality of color component data;

a slicing device configured to convert each of the plurality of color component data into respective bi-level color component data;

a rectangle circumscribing device configured to circumscribe selectively rectangles around linked pixels having identical bi-level values associated with optically dark values and optically light values corresponding to the plurality of bi-level color component data;

a selecting device configured to select the circumscribed rectangles based on size of the circumscribed rectangles;

an inverting device configured to invert the bi-level color component data inside the selected rectangles circumscribing the linked optically dark value pixels and the selected rectangles circumscribing linked optically light value pixels;

a merging device configured to merge the bi-level color component data and inverted bi-level color component data inside the selected circumscribed rectangles; and a data output device configured to output the merged bi-level image data.

13. An apparatus for extracting characters from color image data comprising:

a data input means for inputting color image data;

a color separation means for separating the input color image data into a plurality of color component data;

a slicing means for converting each of the plurality of color component data into respective bi-level color component data;

rectangle circumscribing means for circumscribing selectively rectangles around linked pixels having identical bi-level values associated with optically dark values and optically light values corresponding to the plurality of bi-level color component data;

a selection means for selecting the circumscribed rectangles based on the size of the circumscribed rectangles;

an inversion means for inverting the bi-level color component data inside the selected rectangle circumscribing linked optically dark value pixels and the selected rectangles circumscribing linked optically light value pixels;

a merging means for merging the bi-level color component data and inverted bi-level color component data inside the selected circumscribed rectangles; and a data output means for outputting the merged bi-level image data.

* * * * *